US012756515B2

(12) United States Patent
Xiao et al.

(10) Patent No.: US 12,756,515 B2
(45) Date of Patent: Oct. 6, 2026

(54) METHODS AND APPARATUSES TO FACILITATE LARGER NUMBER OF DMRS PORTS

(71) Applicant: Lenovo (Beijing) Limited, Beijing (CN)

(72) Inventors: Lingling Xiao, Beijing (CN); Bingchao Liu, Beijing (CN); Chenxi Zhu, Beijing (CN); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/848,728

(22) PCT Filed: Jul. 20, 2022

(86) PCT No.: PCT/CN2022/106821

§ 371 (c)(1),
(2) Date: Sep. 19, 2024

(87) PCT Pub. No.: WO2024/016220

PCT Pub. Date: Jan. 25, 2024

(65) Prior Publication Data

US 2025/0233703 A1 Jul. 17, 2025

(51) Int. Cl.
*H04L 5/00* (2006.01)

(52) U.S. Cl.
CPC .................................. *H04L 5/0048* (2013.01)

(58) Field of Classification Search
CPC ............ H04W 72/23; H04W 72/0446; H04W 72/232; H04W 72/1273; H04W 72/12;
(Continued)

(56) References Cited

U.S. PATENT DOCUMENTS 11,843,454 B2 * 12/2023 Chai ................. H04W 74/0841
12,388,594 B2 * 8/2025 Frenne .................. H04L 5/0094
(Continued)

FOREIGN PATENT DOCUMENTS

CN 113330709 A 8/2021
EP 4013175 A1 6/2022
WO 2022033555 A1 2/2022

OTHER PUBLICATIONS

3rd Generation Partnership Proje , "Discussion on DMRS Design", 3GPP TSG RAN WG1 Meeting #88, R1-1702800, [retrieved from the internet on Dec. 16, 2024], <https://www.3gpp.org/ftp/tsg_ran/wg1_rl1/TSGR1_88/Docs/ >, Feb. 13, 2017, 10 pages.
(Continued)

*Primary Examiner* — Eva Y Puente
(74) *Attorney, Agent, or Firm* — FIG. 1 Patents

(57) ABSTRACT

Methods and apparatuses to facilitate larger number of DMRS ports are disclosed. A method may comprise receiving a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 2 is 12 for single-symbol DMRS and 24 for double-symbol DMRS; receiving a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and mapping each of the indicated DMRS ports to a plurality of Resource Elements (REs) in one or more Resource Blocks (RBs) scheduled for the transmission based on the configuration for DMRS.

20 Claims, 15 Drawing Sheets

(58) Field of Classification Search

CPC ........... H04W 72/0453; H04W 72/046; H04W 72/04; H04W 4/06; H04W 72/20; H04W 72/21; H04W 72/30; H04L 5/0053; H04L 5/0048; H04L 5/0094; H04L 5/0051; H04L 5/0023; H04L 5/0035; H04L 5/0007; H04L 5/005; H04L 5/0044; H04L 5/001; H04L 5/0091; H04L 5/00; H04L 5/0057; H04B 7/024; H04B 7/0626; H04B 7/0413; H04B 7/0456; H04B 7/0452; H04B 7/0417; H04B 7/0639; H04B 7/0617; H04B 7/0426; H04B 7/0632; H04B 7/088; H04B 7/26; H04B 7/06952

See application file for complete search history.

(56) References Cited

U.S. PATENT DOCUMENTS

| | | | | |
|---|---|---|---|---|
| 2019/0342865 | A1* | 11/2019 | Shin | H04L 1/1819 |
| 2020/0221435 | A1* | 7/2020 | Kim | H04L 5/0048 |
| 2020/0266964 | A1* | 8/2020 | Kang | H04W 72/23 |
| 2022/0385427 | A1* | 12/2022 | Frenne | H04L 5/0051 |
| 2023/0084494 | A1* | 3/2023 | Wei | H04L 5/0044 370/329 |
| 2023/0198808 | A1* | 6/2023 | Yu | H04L 5/0098 375/262 |
| 2024/0107523 | A1* | 3/2024 | Sun | H04W 76/20 |
| 2024/0267928 | A1* | 8/2024 | Lin | H04W 76/20 |
| 2024/0396684 | A1* | 11/2024 | Khoshnevisan | H04L 5/0051 |
| 2025/0247188 | A1* | 7/2025 | Sun | H04L 5/0051 |
| 2025/0310051 | A1* | 10/2025 | Luo | H04L 5/0026 |

OTHER PUBLICATIONS

3rd Generation Partnership Proje , "Remaining issues on DMRS", 3GPP TSG RAN WG1 Meeting 91, R1-1719692, [retrieved from the internet on Dec. 21, 2022], <https://www.3gpp.org/ftp/tsg_ran/WG1_RL1/TSGR1_91/ Docs>, Nov. 27, 2017, 7 pages.

PCT/CN2022/106821 , "International Search Report and Written Opinion", International Application No. PCT/CN2022/106821, Dec. 21, 2022, 7 pages.

Ericsson, "Increased number of orthogonal DMRS ports", 3GPP TSG-RAN WG1 Meeting #109-e R1-2205112, May 9, 2022, 9 pages.

Extended European Search Report issued in EP Application No. 22951498.9, mailed Dec. 17, 2025, 13 pages.

Samsung (Moderator), "New WID: MIMO Evolution for Downlink and Uplink", 3GPP TSG RAN Meeting #94e RP-213598, Dec. 6, 2021, 6 pages.

Vivo, "Views on DMRS enhancements", 3GPP TSG RAN WG1 #109-e R1-2203544, May 9, 2022, 7 pages.

* cited by examiner

METHODS AND APPARATUSES TO FACILITATE LARGER NUMBER OF DMRS PORTS

FIELD

The subject matter disclosed herein generally relates to wireless communications, and more particularly relates to methods and apparatuses to facilitate larger number of DMRS ports.

BACKGROUND

The following abbreviations are herewith defined, at least some of which are referred to within the following description: Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Equipment (UE), Network Equipment (NE), Radio Access Technology (RAT), Receive or Receiver (RX), Transmit or Transmitter (TX), Physical Broadcast Channel (PBCH), Physical Downlink Control Channel (PDCCH), Physical Downlink Shared Channel (PDSCH), Physical Uplink Shared Channel (PUSCH), Physical Resource Block (PRB), Code-Division Multiplexing (CDM), Downlink Control Information (DCI), Demodulation Reference Signal (DMRS or DM-RS), Frequency-Division Multiplexing (FDM), Frequency Division Multiple Access (FDMA), Index/Identifier (ID), Multiple Input Multiple Output (MIMO), Orthogonal Cover Code (OCC), Resource Block (RB), Resource Element (RE), Reference Signal (RS), Transmission and Reception Point (TRP), Technical Specification (TS), Phase-Tracking Reference Signal (PTRS or PT-RS), Full Duplex (FD), Frequency Division Orthogonal Cover Code (FD-OCC), Time Division Orthogonal Cover Code (TD-OCC) Resource Block (RB), Resource Element (RE), Radio Network Temporary Identifier (RNTI), Transmission and Reception Point (TRP), Cell Radio Network Temporary Identifier (C-RNTI), Configured Scheduling RNTI (CS-RNTI), Pseudo-random Noise (PN), Configured Scheduling (CS).

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied. A TRP is an apparatus to transmit and receive signals, and is controlled by a gNB through the backhaul between the gNB and the TRP.

In Release 15, two types of DMRS are specified. DMRS type 1 includes 2 CDM groups which supports up to 8 DMRS ports and DMRS type 2 includes 3 CDM groups which supports up to 12 DMRS ports. A CDM group includes up to 4 DMRS ports which are orthogonal by FD-OCC and TD-OCC. Therefore, for single-symbol DMRS for which TD-OCC cannot be implemented, DMRS type 1 supports only up to 4 DMRS ports and DMRS type 2 supports up to 6 DMRS ports. And for double-symbol DMRS implemented by TD-OCC, DMRS type 1 supports up to 8 DMRS ports and DMRS type 2 supports up to 12 DMRS ports. Throughout this disclosure, "DMRS type 1" may also be referred to as "type 1 DMRS", and the terms may be used interchangeably. Similarly, "DMRS type 2" may also be referred to as "type 2 DMRS".

Various methods were proposed to increase the number of DMRS ports for PDSCH/PUSCH, including FDM, comb and FD-OCC manner. In Release 18, the number of DMRS ports is doubled for both single-symbol DMRS and double-symbol DMRS. In Release 15, for DMRS type 1, one DMRS port occupies 6 REs in each scheduled RB and the length of FD-OCC is 2. If FD-OCC length is increased to be 4 in Release 18, 2 consecutive RBs need to be bundled for DMRS ports mapping. In this case, if the scheduled RBs is not multiple of 2 RB, there is an orphan RB which is not paired or bundled with another RB of the scheduled RBs. Thus, how to handle the orphan RB needs to be determined.

In addition, in Release 15, when PTRS is configured, each PTRS port is associated with an DMRS port and mapped to one subcarrier (i.e., RE) of the subcarriers occupied by the DMRS port in an RB containing PTRS. However, if the number of DMRS ports is increased by new FDM scheme or new comb pattern in Release 18, the number of REs occupied by a DMRS port of Release 18 is decreased compared to a DMRS port of Release 15. Then the possible RE(s) which a PTRS port can be mapped to may be different from those specified in Release 15. Thus, how to map a PTRS port in Release 18 needs to be resolved as well.

It is therefore an object of the present application to provide methods and apparatuses to facilitate larger number of DMRS ports and solve the orphan RB issue caused by FD-OCC with length 4 and the PTRS port mapping issue caused by new FDM schemes.

BRIEF SUMMARY

Methods and apparatuses to facilitate larger number of DMRS ports are disclosed.

According to a first aspect, there is provided an apparatus, comprising: a transceiver; and a processor coupled to the transceiver, wherein the processor is configured to perform the operations comprising: receiving a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 2 is 12 for single-symbol DMRS and 24 for double-symbol DMRS; receiving a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and mapping each of the indicated DMRS ports to a plurality of Resource Elements (REs) in one or more Resource Blocks (RBs) scheduled for the transmission based on the configuration for DMRS.

According to a second aspect, there is provided an apparatus, comprising: the processor is further configured to perform the operations comprising: receiving a configuration for Phase Tracking Reference Signal (PTRS) including a parameter resourceElementOffset indicating the subcarrier offset of a PTRS port; and mapping the PTRS port to a subcarrier in an RB of every $K_{PT\text{-}RS}$ RBs of the scheduled RBs based on a table, where $K_{PT\text{-}RS}$ is the frequency density of PT-RS transmission and wherein the table includes a parameter p indicating an index of a DMRS port which may be associated with a PTRS port, a parameter $$k_{ref}^{RE}$$

indicating subcarrier of a PTRS port within one or two RBs, and the resourceElementOffset.

According to a third aspect, there is provided an apparatus, comprising: a transceiver; and a processor coupled to the transceiver, wherein the processor is configured to perform the operations comprising: transmitting a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 2 is 12 for single-symbol DMRS and 24 for double-symbol DMRS; transmitting a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and mapping each of the indicated DMRS ports to a plurality of Resource Elements (REs) in one or more Resource Blocks (RBs) scheduled for the transmission based on the configuration for DMRS.

According to a fourth aspect, there is provided a method, comprising: receiving a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 2 is 12 for single-symbol DMRS and 24 for double-symbol DMRS; receiving a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and mapping each of the indicated DMRS ports to a plurality of Resource Elements (REs) in one or more Resource Blocks (RBs) scheduled for the transmission based on the configuration for DMRS.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
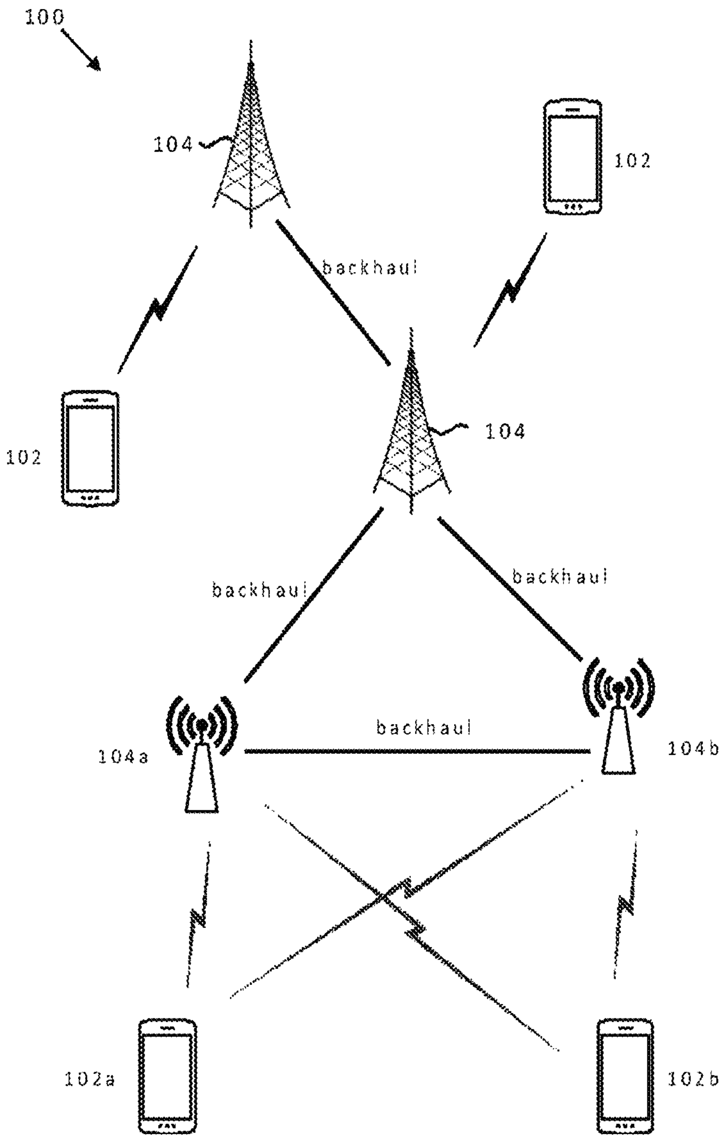
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more", and similarly items expressed in plural form also include reference to one or multiple instances of the item, unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, user device, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the downlink (DL) and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102*a*, 102*b*, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104*a*. In some embodiments, the network equipment may be a gNB 104 that controls a number of TRPs 104*a*. In addition, there is a backhaul between two TRPs 104*a*. In some other embodiments, the network equipment may be a TRP 104*a* that is controlled by a gNB.

Communication links are provided between the NEs 104, 104*a* and the UEs 102, 102*a*, respectively, which, for example, may be NR UL/DL communication links. Some UEs 102, 102*a* may simultaneously communicate with different Radio Access Technologies (RATs), such as NR and LTE.

In some embodiments, the UE 102*a* may be able to communicate with two or more TRPs 104*a* that utilize a non-ideal or ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

Figure 2:
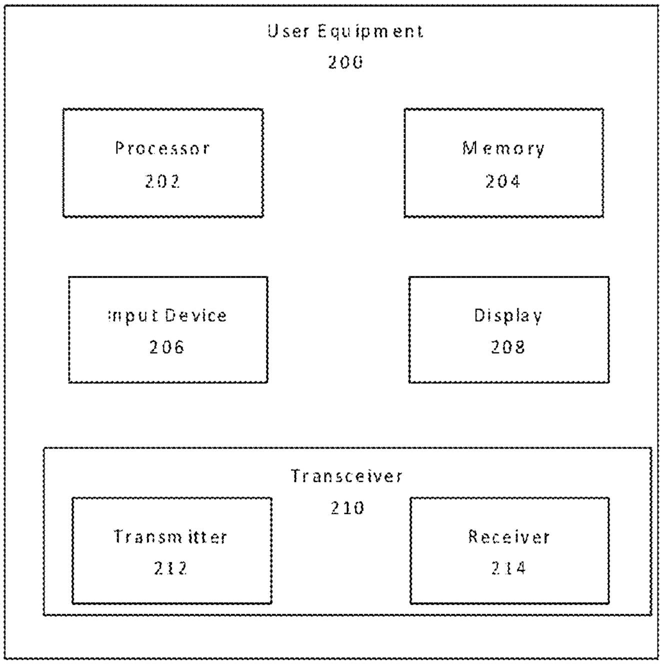
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
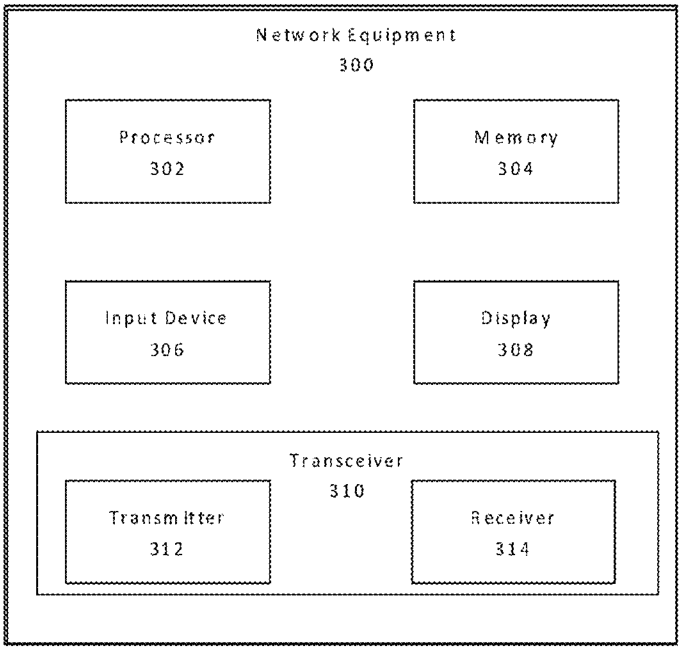
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200.

The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

In Release 15, DMRS mapping is specified in TS 38.211. The following is an extract from TS 38.211 relating to precoding and mapping to physical resources.

6.4.1.1.3 Precoding and Mapping to Physical Resources in TS 38.211

6.4.1.1.3 Precoding and Mapping to Physical Resources

The sequence r(m) shall be mapped to the intermediate quantity $$\tilde{a}_{k,l}^{(\tilde{p}_j,\mu)}$$

according to if transform precoding is not enabled, $$\tilde{a}_{k,l}^{(\tilde{p},\mu)} = w_f(k')\, w_t(l')\, r(2n+k') \qquad \text{(Equation 1)}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

$$j = 0, 1, \ldots, \upsilon - 1$$

where $w_f(k')$, $w_t(l')$ and A are given by Tables 6.4.1.1.3-1 and 6.4.1.1.3-2 and the configuration type is given by the higher-layer parameter DMRS-UplinkConfig, and both k' and Δ correspond to $\tilde{p}_0, \ldots, \tilde{p}_{\upsilon-1}$. The intermediate quantity $$\tilde{a}_{k,l}^{(\tilde{p}_j,\mu)} = 0$$

if Δ corresponds to any other antenna ports than $\tilde{p}_j$.

DMRS mapping for PDSCH transmission is specified in section 7.4.1 in TS 38.211, the principle is same as DMRS for PUSCH with CP-OFDM as cited above.

7.4.1.1.2 Mapping to Physical Resources in TS 38.211

The UE shall assume phase-tracking reference signals being present only in the resource blocks used for the PDSCH, and only if the procedure in [6, TS 38.214] indicates phase-tracking reference signals being used.

If present, the UE shall assume the PDSCH PT-RS is scaled by a factor $\beta_{PT\text{-}RS,i}$ to conform with the transmission power specified in clause 4.1 of [6, TS 38.214] and mapped to resource elements $(k, l)_{p,\mu}$ according to $$a_{k,l}^{(p,\mu)} = \beta_{PT-RS,i} r_k \qquad \text{(Equation 2)}$$

when all the following conditions are fulfilled l is within the OFDM symbols allocated for the PDSCH transmission resource element $(k, l)_{p,\mu}$ is not used for DM-RS, non-zero-power CSI-RS (except for those configured for mobility measurements or with resourceType in corresponding CSI-ResourceConfig configured as 'aperiodic'), zero-power CSI-RS, SS/PBCH block, a detected PDCCH according to clause 5.1.4.1 of [6, TS38.214], or is declared as 'not available' by clause 5.1.4 of [6, TS 38.214]

The set of time indices l defined relative to the start of the PDSCH allocation is defined by 1. set i=0 and $l_{ref}=0$
2. if any symbol in the interval max $(l_{ref}+(i-1)L_{PT\text{-}RS}+1, l_{ref}), \ldots, l_{ref}+iL_{PT\text{-}RS}$ overlaps with a symbol used for DM-RS according to clause 7.4.1.1.2
   set i=1
   set $l_{ref}$ to the symbol index of the DM-RS symbol in case of a single-symbol DM-RS and to the symbol index of the second DM-RS symbol in case of a double-symbol DM-RS
   repeat from step 2 as long as $l_{ref}+iL_{PT\text{-}RS}$ is inside the PDSCH allocation
3. add $l_{ref}+iL_{PT\text{-}RS}$ to the set of time indices for PT-RS
4. increment i by one
5. repeat from step 2 above as long as $l_{ref}+iL_{PT\text{-}RS}$ is inside the PDSCH allocation where $L_{PT\text{-}RS} \in \{1, 2, 4\}$ For the purpose of PT-RS mapping, the resource blocks allocated for PDSCH transmission are numbered from 0 to $N_{RB}-1$ from the lowest scheduled resource block to the highest. The corresponding subcarriers in this set of resource blocks are numbered in increasing order starting from the lowest frequency from 0 to $$N_{sc}^{RB} N_{RB} - 1.$$

The subcarriers to which the UE shall assume the PT-RS is mapped are given by $$k = k_{ref}^{RE} + \left(iK_{PT-RS} + k_{ref}^{RB}\right) N_{sc}^{RB} \qquad \text{(Equation 3)}$$

$$k_{ref}^{RB} = \begin{cases} n_{RNTI} \bmod K_{PT-RS} & \text{if } N_{RB} \bmod K_{PT-RS} = 0 \\ n_{RNTI} \bmod (N_{RB} \bmod K_{PT-RS}) & \text{otherwise} \end{cases}$$

where i=0, 1, 2, . . .

$$k_{ref}^{RE}$$

is given by Table 1: Table 7.4.1.2.2-1 for the DM-RS port associated with the PT-RS port according to clause 5.1.6.3 in [6, TS 38.214]. If the higher-layer parameter resourceElementOffset in the PTRS-DownlinkConfig IE is not configured, the column corresponding to 'offset00' shall be used.

$n_{RNTI}$ is the RNTI associated with the DCI scheduling the transmission $N_{RB}$ is the number of resource blocks scheduled $K_{PT\text{-}RS} \in \{2, 4\}$ is given by [6, TS 38.214].

TABLE 1

Table 7.4.1.2.2-1: The parameter $k_{ref}^{RE}$

Figure 4:
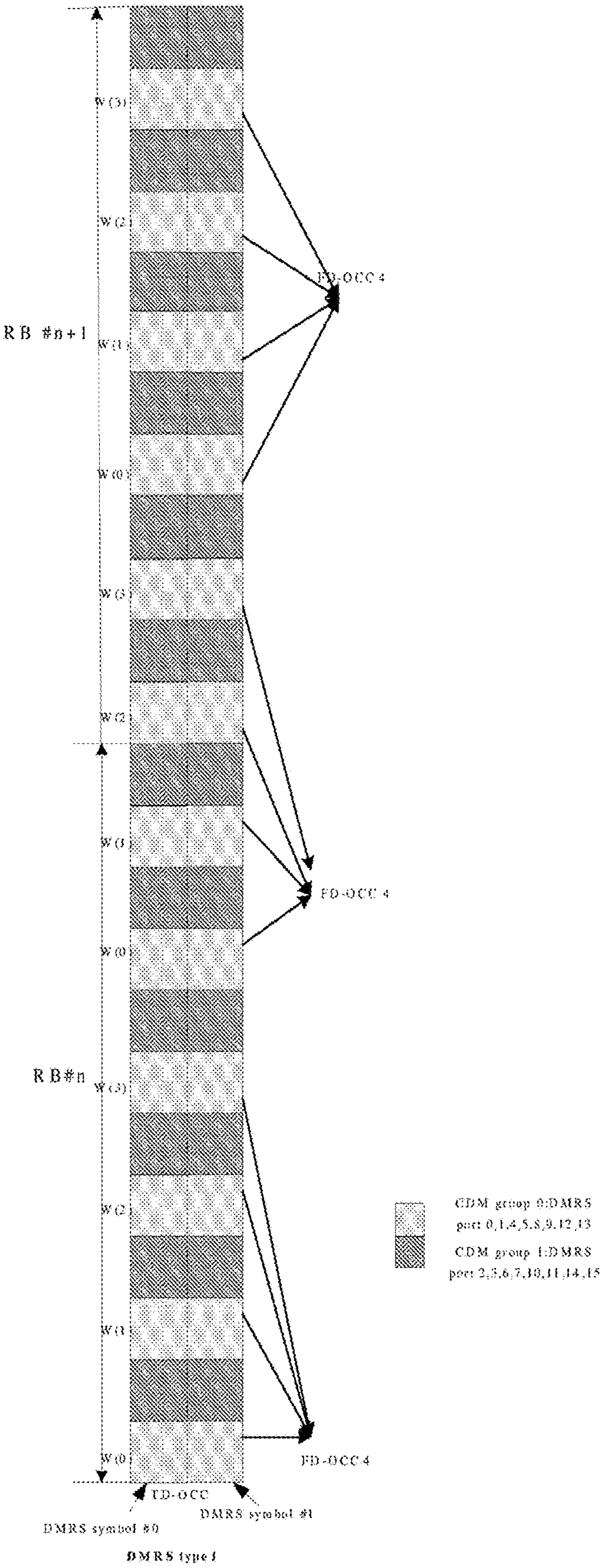
FIG. 4 is a schematic diagram illustrating an example of increasing the number of DMRS ports by FD-OCC of length 4 for DMRS type 1 in accordance with some implementations of the present disclosure.

| DM-RS antenna port p | $k_{ref}^{RE}$ DM-RS Configuration type 1 resourceElementOffset | | | | DM-RS Configuration type 2 resourceElementOffset | | | |
|---|---|---|---|---|---|---|---|---|
| | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

symbol DMRS and support up to 16 DMRS ports for double-symbol DMRS, and DMRS type 2 can support up to 12 DMRS ports for single-symbol DMRS and support up to 24 DMRS ports for double-symbol DMRS. To increase the number of the DMRS ports in Release 18, one method is to keep the same number of CDM groups as in Release 15 and increase the number of DMRS ports in each CDM group by FD-OCC of length 4. An illustration of increasing the number of DMRS ports by FD-OCC of length 4 is shown in FIG. 4. FIG. 4 illustrates double-symbol DMRS (i.e., DMRS symbol #0, DMRS symbol #1), two CDM groups (i.e., CDM group 0, CDM group 1), and two bundled or paired RBs (i.e., RB #n, RB #n+1). The CDM group 0 comprises DMRS port 0, 1, 4, 5, 8, 9, 12 and 13, and the CDM group 1 comprises DMRS port 2, 3, 6, 7, 10, 11, 14 and 15. The 4-length OCC sequences W(0) to W(3) applied to different DMRS ports in a CDM group are orthogonal, where W is the FD-OCC sequence used for a DMRS port and W(i) means the (i+1)-th element of this sequence.

PTRS mapping for PUSCH transmission is specified in section 6.4.1.2 in TS 38.211, the principle is same as PTRS for PDSCH as cited above.

In order to increase the number of DMRS ports in Release 18, different methods, including FD-OCC of length 4 and 6, FDM, comb, TDM and TDM-OCC are proposed. For the orphan RB issue caused by FD-OCC of length 4 method, a method is proposed to introduce RB bundling while another method is proposed to restrict the number of scheduled RB to be even. Those methods will limit gNB's scheduling flexibility and may not be applicable considering the FDM based multiple TRPs PDSCH/PUSCH transmission. For the PTRS mapping issue with increased number of DMRS ports, no method has been proposed yet. This application provides some methods to resolve the orphan RB caused by FD-OCC of length 4 and provides methods to determine the subcarrier of a PTRS port for the larger number of DMRS ports.

FIG. 4 is a schematic diagram illustrating an example of increasing the number of DMRS ports for DMRS type 1 by FD-OCC of length 4.

A UE can receive a configuration for Demodulation Reference Signal (DMRS) and receive a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission. UE can map each of the indicated DMRS ports to a plurality of Resource Elements (REs) in one or more Resource Blocks (RBs) scheduled for the transmission based on the configuration for DMRS.

In one aspect, in Release 15, DMRS type 1 includes 2 CDM groups which supports up to 4 DMRS ports for single-symbol DMRS and supports up to 8 DMRS ports for double-symbol DMRS by TD-OCC. The orthogonality of the 4 DMRS ports of single-symbol DMRS is ensured by two combs and FD-OCC of length 2. A larger number of orthogonal DMRS ports for downlink and uplink MU-MIMO is to be specified in Release 18. In Release 18, DMRS type 1 can support up to 8 DMRS ports for single- Since DMRS ports in a CDM group occupied 6 REs in an RB, if the length of FD-OCC is increased to be 4, two adjacent RBs should be used together to ensure the orthogonality between different DMRS ports, as shown in FIG. 4. If the number of RBs of a transmission to a TRP is odd, there will be an orphan RB which can't be paired or bundled with another RB. The orphan RB can be the first RB or the last RB of the scheduled RBs. Then how to ensure the orthogonality between DMRS ports in the orphan RB need to be resolved, since by the mapping rule specified in Release 15, a DMRS port may multiply a fraction of the OCC sequence when it is mapped to the orphan RB and the fraction of the OCC sequences corresponding to different DMRS ports may not be orthogonal. For example, a DMRS port only multiplies W(0) and W(1) when it is mapped to the last two REs corresponding to the DMRS port. Thus, when an odd number of RBs are scheduled for the transmission to a TRP, for RBs other than the orphan RB, a UE can map each of the indicated DMRS ports to each RE corresponding to a CDM group to which the DMRS port is grouped in the RBs. For the orphan RB, the present application proposes several methods for mapping the DMRS ports to the orphan RB.

Figure 5:
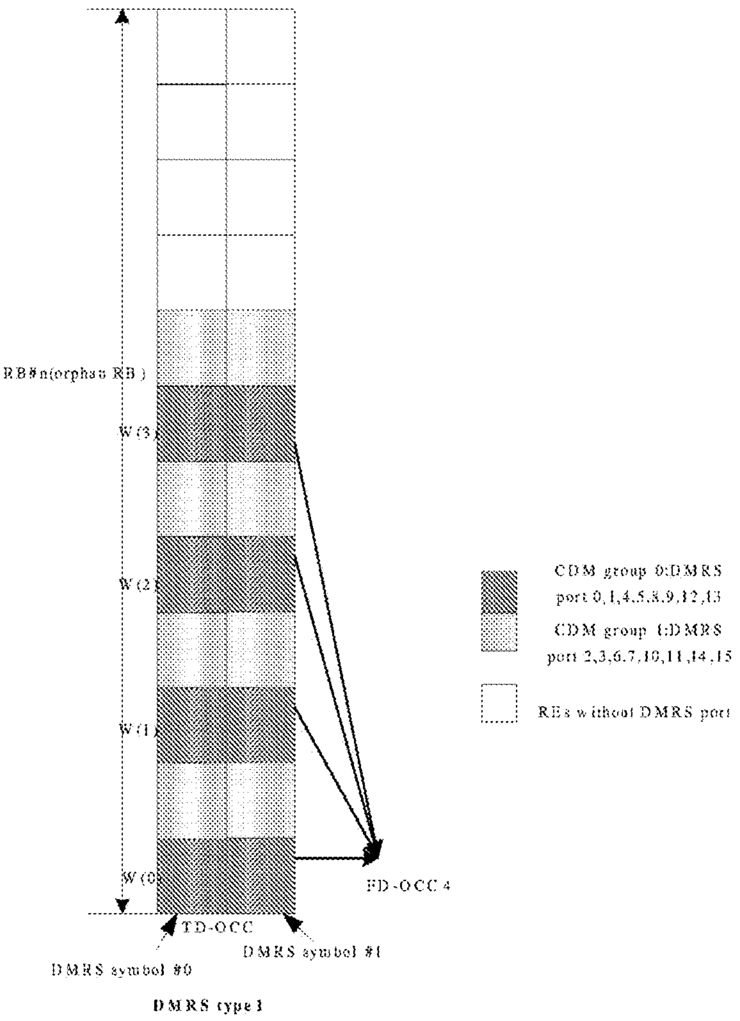
FIG. 5 is a schematic diagram illustrating an example of mapping DMRS ports to orphan RB in accordance with some implementations of the present disclosure.

FIG. 5 is a schematic diagram illustrating an example of mapping DMRS ports to orphan RB in accordance with some implementations of the present disclosure.

In order to avoid a DMRS port multiplying a fractional OCC sequence and ensure the orthogonality of different DMRS ports, a method of restriction of incomplete DMRS mapping to the orphan RB is proposed in the present application. That is, a DMRS port is not mapped to the orphan RB or a DMRS port is not mapped to the last 2 REs corresponding to the CDM group to which the DMRS port is grouped in the orphan RB. The channel matrix estimated from the REs without any DMRS port mapping can be extrapolated by the channel matrices estimated from the REs with DMRS port mapping. The mapping pattern as shown in FIG. 5 is an example of not mapping a DMRS port to the last 2 REs corresponding to the CDM group in the orphan RB. In this example, for the orphan RB, the method can include only mapping the DMRS ports to a first set of REs including a plurality of REs (e.g., the $1^{st}$, $3^{rd}$, $5^{th}$, $7^{th}$ RE) corresponding to a CDM group (e.g., CDM 0) to which the DMRS port is grouped and without mapping any DMRS port to a second set of REs including the remaining REs (e.g., the $9^{th}$, $11^{th}$ RE) corresponding to the CDM group in the orphan RB. In this case, a DMRS port multiplies a complete OCC sequence W(0) to W(3) when it is mapped to the first set of REs.

As another example, the method can include only mapping each of the indicated DMRS ports to REs in RBs other than the orphan RB and without mapping any DMRS port to REs in the orphan RB. In this case, no DMRS ports are mapped to the orphan RB.

According to one embodiment, suppose a DCI format 1_1 schedules a PDSCH transmission, the DMRS is of type 1, and FD-OCC length 4 is used to increase the number of DMRS ports in Release 18, as shown in FIG. 4. Suppose that the number of scheduled RBs is 45 and four DMRS ports indicated by the received DCI are DMRS port #0, DMRS port #1, DMRS port #8 and DMRS port #9 which are mapped to light grey REs in FIG. 4. In one example, each DMRS port of the four DMRS ports is mapped to every two RBs of RB 0 to RB 43 as illustrated in FIG. 4 and each DMRS port of the four DMRS ports is mapped to RB 44 (i.e., the orphan RB) as illustrated in FIG. 5. In another example, the four DMRS ports are only mapped to every two RBs of RB 0 to RB 43, and no DMRS ports are mapped to RB 44.

Figure 6:
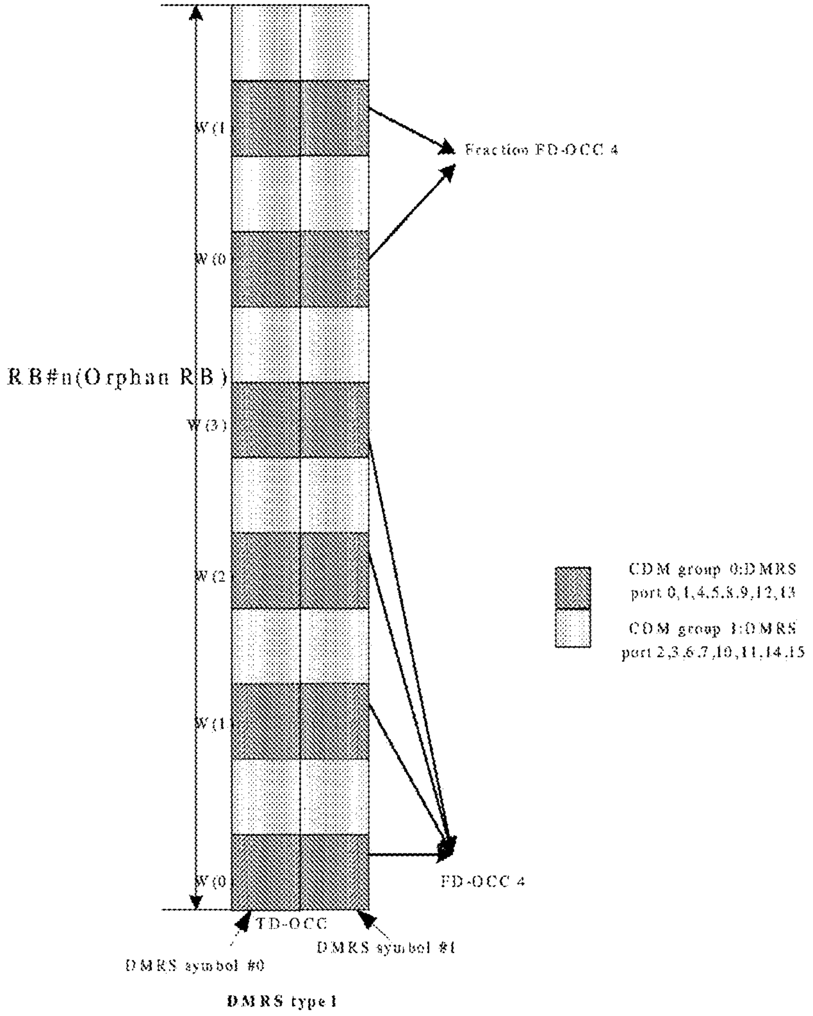
FIG. 6 is a schematic diagram illustrating an example of mapping DMRS ports to orphan RB in accordance with some implementations of the present disclosure.

FIG. 6 is a schematic diagram illustrating an example of mapping DMRS ports to orphan RB in accordance with some implementations of the present disclosure.

For the orphan RB, a method of restriction on DMRS port indication is proposed in the present application. The method can include, for the orphan RB, mapping each of the indicated DMRS ports to all the REs corresponding to a CDM group to which the DMRS port is grouped. When each of the indicated DMRS ports is mapped to all the REs corresponding to a CDM group to which the DMRS port is grouped in the orphan RB, the fractional sequences, made up by first two elements of the 4-length OCC sequences corresponding to the indicated DMRS ports, are orthogonal.

The 4-length FD-OCC sequences applied to different DMRS ports in a CDM group should be orthogonal. When mapping a DMRS port to the orphan RB, the DMRS port may multiply a fractional OCC sequence of the original 4-length OCC sequence as shown in FIG. 6. If the fractional FD-OCC sequences of the indicated DMRS port are also orthogonal, a gNB can schedule an odd number of RBs for a PDSCH/PUSCH transmission to a TRP. Therefore, in this method, a gNB may schedule both even and odd number of RBs for PDSCH/PUSCH transmission. But when a gNB schedules a PDSCH/PUSCH transmission to a TRP with odd number of RBs, the fractional OCC sequences corresponding to the indicated DMRS ports should be orthogonal. In other words, the fractional 2-length FD-OCC, made up by first two elements of the 4-length OCC sequences, should be ensured for the indicated DMRS ports mapped to the last 2 REs corresponding to a CDM group to which the DMRS port is grouped in the orphan RB.

An example of OCC sequences of length 4 can be $$W_{Occ4} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

It can be noted that the fractional sequences, i.e., the sequence containing the $1^{st}$ and the $2^{nd}$ element of the 4-length FD-OCC sequence of $1^{st}$ column (i.e., [1 1]) and the sequence containing the $1^{st}$ and the $2^{nd}$ element of the sequence of $2^{nd}$ and $4^{th}$ column (i.e., [1 −1]), are orthogonal, but the fractional sequences of $1^{st}$ column (i.e., [1 1]) and $3^{rd}$ column (i.e., [1 1]), are not orthogonal. Therefore, DMRS port which multiply the OCC sequence [1 1 1 1] and DMRS port which multiply OCC sequence [1 1 −1 −1] shall not be indicated simultaneously. It means that, if an entry in the antenna ports table including DMRS port which multiply sequence [1 1 1 1] and DMRS port which multiply sequence [1 1 −1 −1], gNB shall not indicate the entry to a UE when the number of RBs of a transmission to a TRP is odd. A UE does not expect a DMRS port which multiply the sequence [1 1 1 1] and a DMRS port which multiply the sequence [1 1 −1 −1] to be indicated simultaneously when the number of RB of a transmission to a TRP is odd. Similarly, DMRS port which multiply the sequence [1 −1 1 −1] and DMRS port which multiply the sequence [1 −1 −1 1] shall not be indicated simultaneously too.

According to one embodiment, suppose that a DCI format 0_1 schedules a PUSCH transmission and the DMRS is of type 1, and FD-OCC length 4 is used to increase the number of DMRS ports in Release 18, as shown in FIG. 4. Suppose that four DMRS ports indicated by the received DCI are DMRS port #0, DMRS port #1, DMRS port #8 and DMRS port #9 and these indicated ports multiply OCC sequence [1 1 1 1], [1 −1 1 −1], [1 1 −1 −1] and [1 −1 −1 1] respectively. Suppose that the rank of the PUSCH transmission is 2 and the DMRS port combinations includes {0, 1}, {0, 8}, {0, 9}, {1, 8}, {1, 9} and {8, 9}. If the number of RB of a transmission to a TRP is odd, UE does not expect to be indicated with DMRS port combinations {0, 8} and {1, 9}. Rather, DMRS port combinations {0, 1}, {0, 9}, {1, 8} and {8, 9}can be indicated in the DCI. If the number of scheduled RB is even RBs, any DMRS ports combinations can be indicated in the DCI.

Another method for mapping the DMRS ports to the orphan RB is restriction on the number of scheduled RBs.

If the number of scheduled RBs of a PDSCH/PUSCH transmitted from/to each Transmission Receiving Point (TRP) is even, there is no orphan RB issue. Specifically, if the PDSCH/PUSCH transmission is with TDM or SDM scheme, the number of scheduled RBs should be even. If a PDSCH transmission is with the FDM 2*a* or FDM 2*b* or a PUSCH transmission is with FDM scheme, the first $\lceil n_{PRB}/2 \rceil$ PRBs are transmitted from/to a first TRP and the remaining $\lceil n_{PRB}/2 \rceil$ PRBs are transmitted from/to a second TRP, wherein $n_{PRB}$ is the total number of allocated PRBs for a UE. Therefore, when a PDSCH or a PUSCH transmission is with FDM scheme, the scheduled number of PRBs should be multiple of 4. For a PDSCH transmission, a PDSCH transmission to different TRPs means a PDSCH transmission is transmitted according to different TCI states of type D. For a PUSCH transmission, a PUSCH transmission to different TRPs means a PUSCH transmission is transmitted according to different SRS resource sets.

In another aspect, in Release 15, when PTRS is configured, each PTRS port is associated with a DMRS port and mapped to one subcarrier (i.e., RE) of the subcarriers occupied by the DMRS port in an RB containing PTRS. A UE can receive a configuration for Phase Tracking Reference Signal (PTRS) from gNB. The exact subcarrier of the PTRS port is indicated by combination of RRC and DCI. However, if the number of DMRS ports is increased by new FDM scheme or new comb pattern in Release 18, the number of REs occupied by a DMRS port is decreased compared to a DMRS port of Release 15. As a result, the possible RE(s) which a PTRS can be mapped to may be different from those specified in Release 15.

In Release 15, a PTRS port is mapped to one subcarrier in an RB of every $K_{PT\text{-}RS}$ RBs, where $K_{PT\text{-}RS}$ is the frequency density of PT-RS transmission. The RB level offset, denoted as $$k_{ref}^{RB},$$

is determined based on the RNTI associated with the scheduling DCI, the scheduled number of RBs and the PTRS frequency density. The RE level offset within an RB containing PT-RS, denoted as $$k_{ref}^{RE},$$

is specified in table 7.4.1.2.2-1/6.4.1.2.2.1-1 from TS 38.211 as shown above in table 1. In this table, the resource element offset parameter resourceElementOffset, i.e., "offset00", "offset01", "offset10" or "offset11", indicates the subcarrier offset of a PTRS port and can be configured by RRC. The parameter p indicating an index of a DMRS port which may be associated with a PTRS port. The parameter $$k_{ref}^{RE}$$

indicating subcarrier of a PTRS port within an RB.

In Release 18, a PTRS port may be associated with an additional DMRS port, e.g., DMRS port 1006, 1007, 1008, 1009, 1010, 1011 for DMRS type 1, and if a PTRS port is associated with an additional DMRS port, the corresponding $$k_{ref}^{RE}$$

needs to be determined. Besides, if the number of the DMRS ports are increased by FDM or comb manner, the number of REs corresponding to a DMRS port in Release 18 will be reduced compared to a DMRS port in Release 15. In addition, even if a PTRS port is associated with a legacy DMRS port, the $$k_{ref}^{RE}$$

specified in Release 15 also needs to be enhanced. Thus, subcarriers in the RBs to which a PTRS port can be mapped can be determined based on a new table. The new table can also include a parameter p indicating an index of a DMRS port may associated with a PTRS port, a parameter $$k_{ref}^{RE}$$

indicating subcarrier of a PTRS port within one or two RBs of every $K_{PT\text{-}RS}$ RBs, where $K_{PT\text{-}RS}$ is the frequency density of PT-RS transmission, and the parameter resourceElementOffset indicating the subcarrier offset of a PTRS port. The table can include a plurality of entries corresponding to a plurality of DMRS ports supported by single-symbol DMRS, and a plurality of columns corresponding to a plurality of offset values configured by resourceElementOffset. In particular, the parameter p can be DMRS port 0, 1, 2, 3, 8, 9, 10, 11 for DMRS type 1 and the parameter p can be DMRS port 0, 1, 2, 3, 4, 5, 12, 13, 14, 15, 16, 17 for DMRS type 2. In each entry the values of subcarrier $$k_{ref}^{RE}$$

is some or all of the index of REs of the associated DMRS port in an RB or in two RBs, and in each column the values of subcarrier $$k_{ref}^{RE}$$

are different for different value of parameter p. Even though some of the embodiments in the present application are described with respect to the single-symbol DMRS, these embodiments can also be implemented with respect to the double-symbol DMRS.

Figure 7:
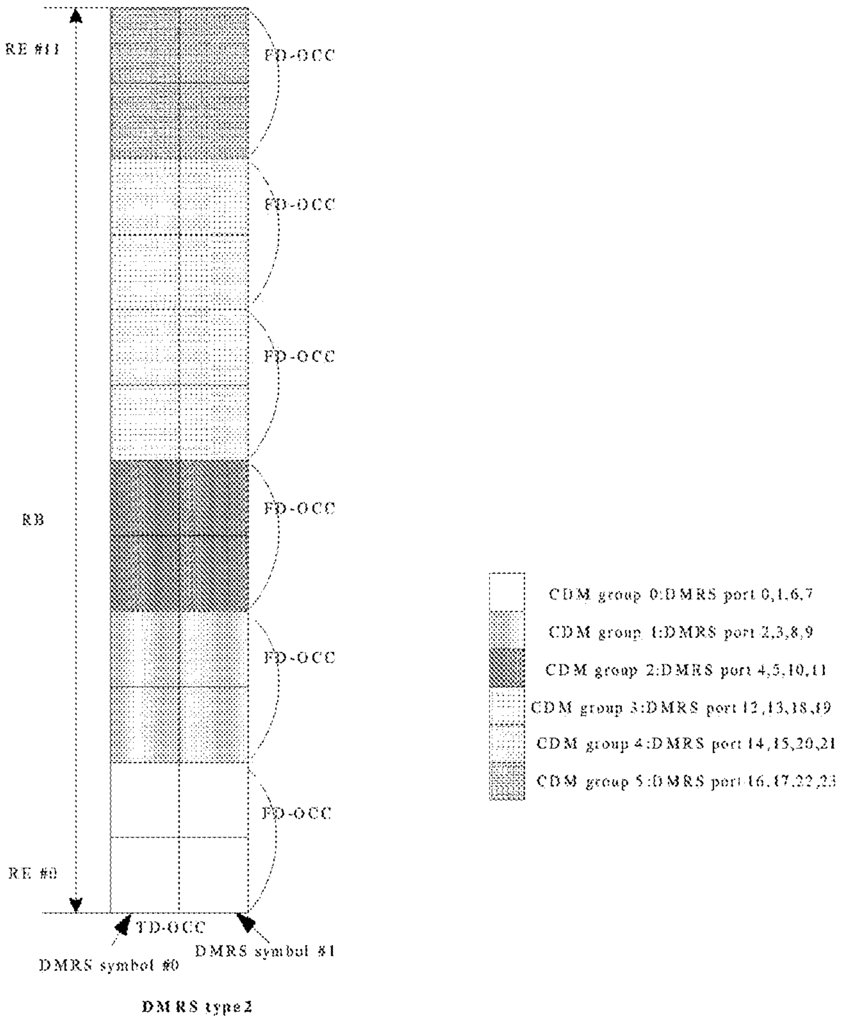
FIG. 7 is a schematic diagram illustrating an example of increasing the number of DMRS ports for DMRS type 2 in accordance with some implementations of the present disclosure.

FIG. 7 is a schematic diagram illustrating an example of increasing the number of DMRS ports for DMRS type 2 in accordance with some implementations of the present disclosure. In the embodiment shown in FIG. 7, the number of DMRS ports is increased by FDM or comb for DMRS type 2. The number of REs to which a DMRS port can be mapped is reduced by half compared to a DMRS port specified in Release 15. In other words, not all values of the $$k_{ref}^{RE}$$

in the table specified in Release 15 is applicable to a Release 18 DMRS port. For example, for DMRS type 2, if a PTRS port is associated with DMRS port 0, $$k_{ref}^{RE}$$

equals 6 or 7 specified in Release 15 may not be applicable.

For DMRS type 2, an embodiment of mapping DMRS ports to each scheduled RB is shown in FIG. 7. In this embodiment, each DMRS port can be mapped to 2 REs in an RB for a single symbol. Therefore, the number of candidate subcarrier of a PTRS port is two and thus two resource element offsets are valid, as shown in table 2. That is, a UE expect the parameter resourceElementOffset to be configured as "offset00" or "offset01" when Release 18 DMRS ports are indicated and the number of DMRS port is increased by FDM/comb for DMRS type 2.

In this embodiment, the plurality of DMRS ports are grouped into 6 CDM groups. Table 2 is an example table that includes 2 columns corresponding to a first offset value "offset00" and a second offset value "offset01" respectively configured by resourceElementOffset and 12 entries with each entry corresponds to each DMRS port p of the 12 DMRS port, 1000, 1001, 1002, 1003, 1004, 1005, 1012, 1013, 1014, 1015, 1016 and 1017. Please note that the tables as listed below are for the purpose of illustration rather than limitation. The terms "entry" and "column" of the table can be used interchangeably.

In table 2, the values of subcarrier $$k_{ref}^{RE}$$

are {0, 1, 2, 3, 4, 5, 6, 7, 8, 9, 10, 11} for "offset00" and are {1, 0, 3, 2, 5, 4, 7, 6, 9, 8, 11, 10} for "offset01". In another example of table 2, the values of subcarrier $$k_{ref}^{RE}$$

are {0, 1, 2, 3, 4, 5, 6, 7, 8, 9, 10, 11} for "offset01" and are {1, 0, 3, 2, 5, 4, 7, 6, 9, 8, 11, 10} for "offset00". The DMRS ports in a same CDM group correspond to the same set of candidate subcarriers for a PTRS port. Thus, the values of subcarrier $$k_{ref}^{RE}$$

for a PTRS port associated with different DMRS ports in a same CDM group, for example, DMRS port "1000" and "1001" in CDM group 0, correspond to the same set of values, for example, {0, 1}, as shown in table 2. The DMRS ports in different CDM groups correspond to different sets of candidate subcarriers for a PTRS port. Thus, the values of subcarrier $$k_{ref}^{RE}$$

for a PTRS port associated with different DMRS ports in different CDM groups, for example, CDM group 0 including DMRS port "1000" and "1001" and CDM group 1 including DMRS port "1002" and "1003", correspond respectively to the different set of values, for example, {0, 1} and {2, 3}, as shown in table 2.

TABLE 2

The parameter $k_{ref}^{RE}$ of DMRS type 2

| DM-RS antenna port | $k_{ref}^{RE}$ DM-RS Configuration type 2 resourceElementOffset | | | |
|---|---|---|---|---|
| p | offset00 | offset01 | offset10 | offset11 |
| 1000 | 0 | 1 | — | — |
| 1001 | 1 | 0 | — | — |
| 1002 | 2 | 3 | — | — |
| 1003 | 3 | 2 | — | — |
| 1004 | 4 | 5 | — | — |
| 1005 | 5 | 4 | — | — |
| 1012 | 6 | 7 | — | — |
| 1013 | 7 | 6 | — | — |
| 1014 | 8 | 9 | — | — |
| 1015 | 9 | 8 | — | — |
| 1016 | 10 | 11 | — | — |
| 1017 | 11 | 10 | — | — |

Another method to determine subcarriers in the RBs to which a PTRS port can be mapped can include reusing the $$k_{ref}^{RE}$$

in table 1 specified in Release 15 with resourceElementOffset configured as only "offset00" and "offset01". If a PTRS port is associated with a DMRS port in Release 18, the subcarrier, denoted as $$k_{ref}^{RE'}$$

of the PTRS is determined by $$6\cdot\left\lfloor\frac{(p-1000)}{12}\right\rfloor+k_{ref}^{RE}\bmod 6,$$

wherein $$k_{ref}^{RE'}$$

is an updated parameter for $$k_{ref}^{RE}$$

indicating subcarrier of a PTRS port in the scheduled RBs to which a PTRS port is mapped.

For DMRS type 1, different methods are proposed to double the number of DMRS ports, for example by FDM or comb or FD-OCC2+FD-OCC6. For different methods, considering the different mapping of a DMRS port, the subcarrier of an associated PTRS port is also different.

The following embodiments describe the case for DMRS type 1 when the DMRS ports are increased by FDM. For DMRS type 1, the plurality of DMRS ports are grouped into 4 CDM groups and each DMRS port multiplies an OCC sequence of length 2.

In these embodiments, the mapping of a DMRS port to two adjacent RBs is different. In view of this, two methods are provided to determine the subcarrier of a PTRS port in an RB.

Method 1:

$$k_{ref}^{RE}$$

is Defined within an RB

Figure 8:
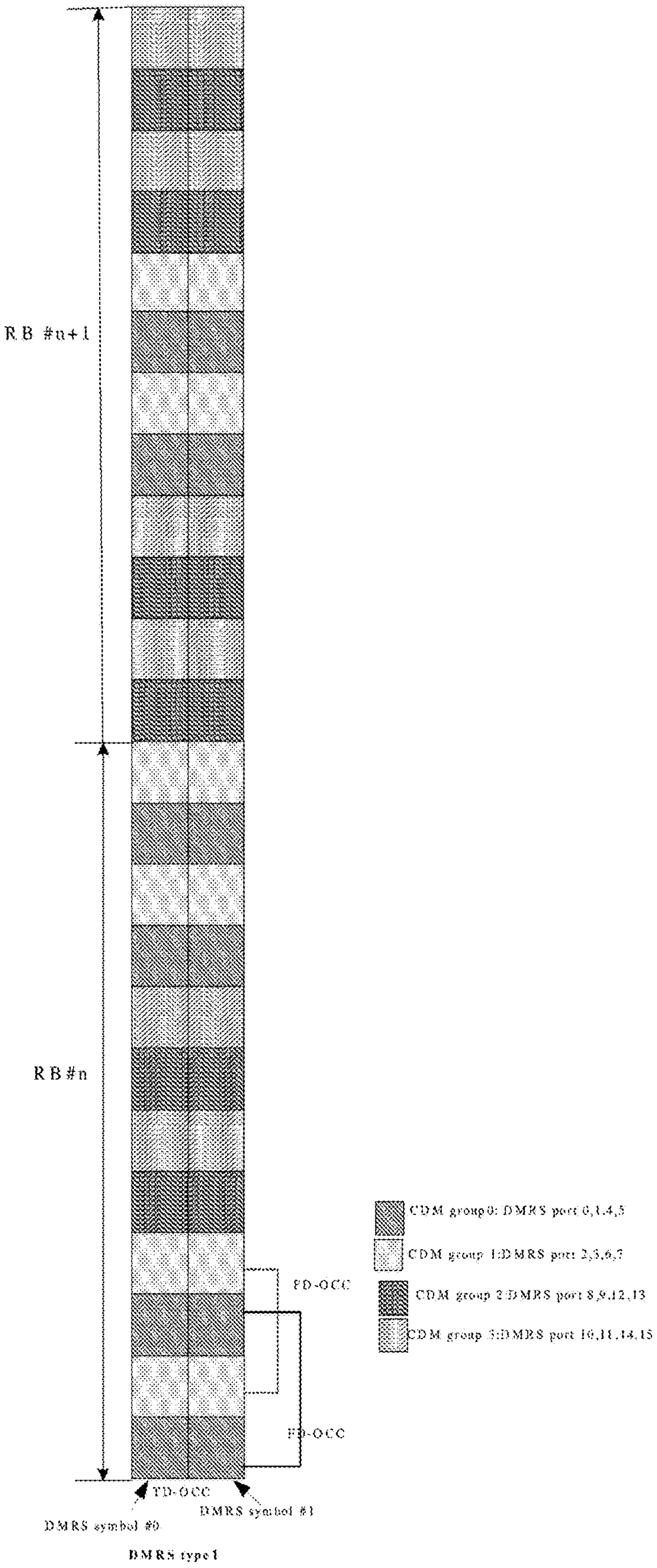
FIG. 8 is a schematic diagram illustrating an example of increasing the number of DMRS ports by FDM for DMRS type 1 in accordance with some implementations of the present disclosure.

FIG. 8 is a schematic diagram illustrating an example of increasing DMRS ports by FDM for DMRS type 1 in accordance with some implementations of the present disclosure.

For DMRS type 1, since a DMRS port can be mapped to 4 REs in an RB and another DMRS port can be mapped to 2 REs in the same RB, besides a PTRS port associated with which DMRS port is dynamically indicated in DCI, the number of candidate subcarriers of a PTRS port is two. That is, if a UE is indicated with Release 18 DMRS port, the resourceElementOffset shall be configured as "offset00" or "offset01" when the DMRS ports are increased by FDM for DMRS type 1. Otherwise, if RRC configures resource element offset to be "offset10" or "offset11", and if DCI associates a PTRS port with a DMRS port which is mapped to 2 REs in an RB, a UE can't determine a subcarrier for the PTRS port. Besides, since the mapping of a DMRS port in two adjacent RBs is different and a PTRS port mapped to physical resource may start with any RB, therefore with different values of $$k_{ref}^{RE},$$

the subcarrier of a PTRS port associated with a DMRS port is also different, as shown in table 3.

In this embodiment, the plurality of DMRS ports are grouped into 4 CDM groups and each DMRS port multiplies an OCC sequence of length 2. Accordingly, table 3 is an example table that includes 2 columns corresponding to 2 offset values configured by resourceElementOffset and 8 entries with each entry corresponds to each DMRS port p of the 8 DMRS ports supported by the single-symbol DMRS. The value of $$k_{ref}^{RE}$$

in each entry is based on $$\mathrm{mod}\left(k_{ref}^{RE}, 2\right).$$

In an example as shown in Table 3, for the case of $$\mathrm{mod}\left(k_{ref}^{RE}, 2\right) = 0,$$

DMRS ports grouped into CDM group 0 and CDM group 1 can be mapped to 4 REs in the RB. Therefore, the values of $$k_{ref}^{RE}$$

for parameter p 1000 and 1001 can be any value from 0, 2, 8, 10, and the values of $$k_{ref}^{RE}$$

for parameter p 1002 and 1003 can be any value from 1, 3, 9, 11. For the same case, DMRS ports grouped into CDM group 2 and CDM group 3 can be mapped to 2 REs in the RB. Therefore, the values of $$k_{ref}^{RE}$$

for parameter p 1008 and 1009 can be any value from 4, 6 and the values of $$k_{ref}^{RE}$$

for parameter p 1010 and 1011 can be any value from 5, 7. Similarly, for the case of $$\mathrm{mod}\left(k_{ref}^{RB}, 2\right) = 1,$$

the values of $$k_{ref}^{RE}$$

for parameter p 1000 and 1001 can be any value from 4, 6 and the values of $$k_{ref}^{RE}$$

for parameter p 1002 and 1003 can be any value from 5, 7. The values of $$k_{ref}^{RE}$$

for parameter p 1008 and 1009 can be any value from 0, 2, 8, 10 and the values of $$k_{ref}^{RE}$$

for parameter p 1010 and 1011 can be any value from 1, 3, 9, 11. For a same resourceElementOffset, the value of $$k_{ref}^{RE}$$

corresponds to different parameter p shall be different. In table 3, the parameter $$k_{ref}^{RE}$$

is defined within one RB, the parameter $$k_{ref}^{RB}$$

is the RB offset for mapping the PTRS port, and can be determined based on Equation 3. In another example (not shown), for the case of $$\mathrm{mod}\left(k_{ref}^{RB}, 2\right) = 0,$$

the values of $$k_{ref}^{RE}$$

for each parameter p in this example can be the values for respective parameter for the case of $$\mathrm{mod}\left(k_{ref}^{RB}, 2\right) = 1$$

as shown in Table 3, and accordingly, for the case of $$\mathrm{mod}\left(k_{ref}^{RB}, 2\right) = 1,$$

the values of $$k_{ref}^{RE}$$

for each parameter p in this example can be the values for respective parameter for the case of $$\mathrm{mod}\left(k_{ref}^{RB}, 2\right) = 0$$

as shown in Table 3. In other words, the example table in this example is similar to table 3 except that the respective values are interchanged for the cases of $$\mathrm{mod}\left(k_{ref}^{RB}, 2\right) = 0 \text{ and } \mathrm{mod}\left(k_{ref}^{RB}, 2\right) = 1.$$

TABLE 3

The parameter $k_{ref}^{RE}$ of DMRS type 1

| DM-RS antenna port | $k_{ref}^{RE}$ | | | | | | | |
|---|---|---|---|---|---|---|---|---|
| | DM-RS Configuration type 1 mod($k_{ref}^{RB}$, 2) = 0 resourceElementOffset | | | | DM-RS Configuration type 1 mod($k_{ref}^{RB}$, 2) = 1 resourceElementOffset | | | |
| p | offset00 | offset01 | offset10 | offset11 | offset00 | offset01 | offset10 | offset11 |
| 1000 | 0 | 2 | — | — | 4 | 6 | — | — |
| 1001 | 2 | 0 | | | 6 | 4 | | |
| 1002 | 1 | 3 | | | 5 | 7 | | |
| 1003 | 3 | 1 | | | 7 | 5 | | |
| 1008 | 4 | 6 | — | — | 0 | 2 | — | — |
| 1009 | 6 | 4 | — | — | 2 | 0 | — | — |
| 1010 | 5 | 7 | — | — | 1 | 3 | — | — |
| 1011 | 7 | 5 | — | — | 3 | 1 | — | — |

Figure 9A:
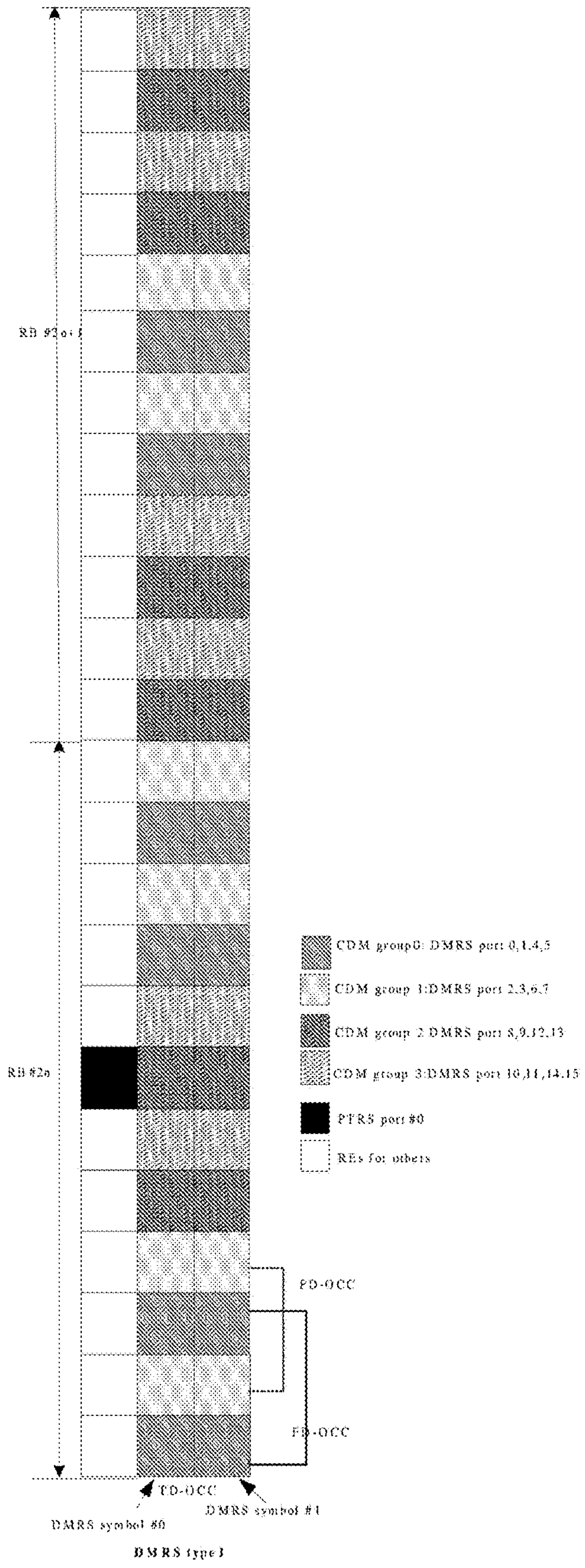
FIGS. 9*a* and 9*b* are schematic diagrams illustrating examples of PTRS port mapping in accordance with some implementations of the present disclosure.
Figure 9B:
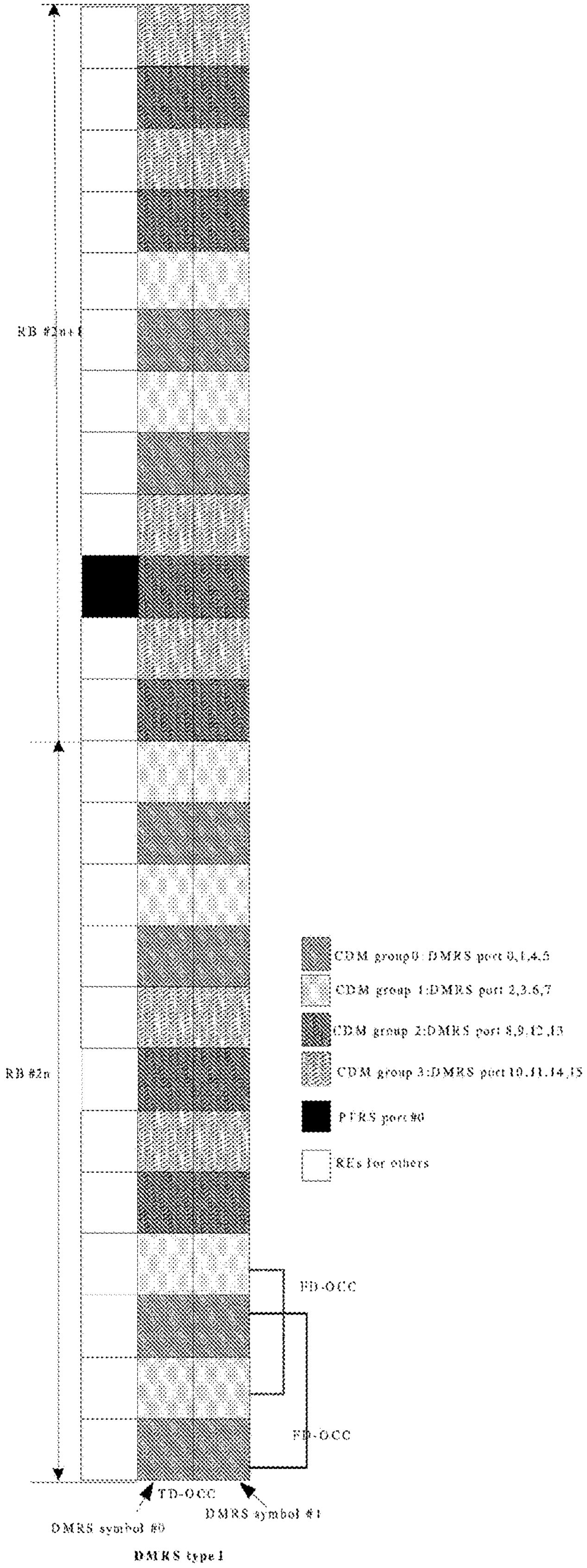

FIGS. 9*a* and 9*b* are schematic diagrams illustrating examples of PTRS port mapping in accordance with some implementations of the present disclosure. For FIG. 9*a*, $$k_{ref}^{RB} = 0,$$

and for FIG. 9*b*, $$k_{ref}^{RB} = 1.$$

According to an embodiment, suppose that a DCI format 0_1 schedules a PUSCH transmission and the DMRS is type 1, and FDM method is used to increase the DMRS ports in Release 18, as shown in FIG. 8. Suppose that Release 18 DMRS port #0, DMRS port #1, DMRS port #8 and DMRS port #9 are indicated in DCI for the PUSCH transmission. Suppose that the number of PTRS port is one and resourceElementOffset is configured as "offset01" by RRC. The DCI indicates that PTRS port #0 is associated with DMRS port #8 and $K_{PT\text{-}RS}$ is two. Then if $$k_{ref}^{RB}$$

is calculated as 0 by Equation 3, PTRS port #0 can be mapped to 7th RE (i.e., RE 6) according to table 3 from the first scheduled RB (i.e., RB 0) to the last scheduled RB with step of 2 RBs, as shown in FIG. 9*a*; if $$k_{ref}^{RB}$$

is calculated as 1 by Equation 3, PTRS port #0 can be mapped to 3rd RE (i.e., RE 2) according to table 3 from the second scheduled RB (i.e., RB 1) to the last scheduled RB with step of 2 RBs, as shown in FIG. 9*b*.

Method 2:

$$k_{ref}^{RE}$$

is Defined within Two Adjacent RBs

For DMRS type 1, since a DMRS port can be mapped to same REs within every two RBs and the frequency density of PTRS is 2 RBs or 4 RBs when PTRS exist, the subcarrier of a PTRS port can be defined in the two adjacent RBs. However, since the granularity becomes 2 RBs, the RB level offset needs to be enhanced as every 2 RBs offset. The $$k_{ref}^{2RB}$$

is calculated by:

$$k_{ref}^{2RB} = \begin{cases} n_{RNTI} \bmod (K_{PT-RS}/2) & \text{if } N_{RB} \bmod (K_{PT-RS}/2) = 0 \\ n_{RNTI} \bmod (N_{RB} \bmod (K_{PT-RS}/2)) & \text{otherwise} \end{cases} \quad \text{(Equation 4)}$$

where the $K_{PT-RS}$ is the frequency density of the PTRS port, $n_{RNTI}$ is the RNTI associated with the DCI scheduling the transmission and $N_{RB}$ is the number of scheduled RBs.

That is, when the frequency density of a PTRS port is 2 RBs, i.e., $K_{PT-RS}$=2, the $$k_{ref}^{2RB} \text{ equals } 0;$$

when the frequency density of a PTRS port is 4 RBs, i.e., $K_{PT-RS}$=4, if the number of scheduled RBs is even, the $$k_{ref}^{2RB}$$

of equals $n_{RNTI}$ mod 2, and if the number of scheduled RBs is odd, the $$k_{ref}^{2RB} \text{ equals } 0.$$

The UE shall assume the PT-RS is mapped are given by:

$$k = k_{ref}^{RE} + (iK_{PT-RS} + 2 * k_{ref}^{2RB}) N_{SC}^{RB} \quad \text{(Equation 5)}$$

where $$N_{sc}^{RB}$$

is the number of subcarriers in an RB, i=0, 1, 2, . . . , and the $$k_{ref}^{RE}$$

is shown in table 4.

In this embodiment, for DMRS type 1, the plurality of DMRS ports are grouped into 4 CDM groups and each DMRS port multiplies an OCC sequence of length 2. Table 4 is an example table that includes 4 columns corresponding to 4 offset values configured by resourceElementOffset and 8 entries with each entry corresponds to each DMRS port p of the 8 DMRS ports supported by the single-symbol DMRS, wherein $$k_{ref}^{RE}$$

is defined within two adjacent RBs. Each DMRS port can be mapped to 6 REs in each 2 RBs, therefore, the values of $$k_{ref}^{RE}$$

for parameter p 1000 and 1001 can be any value from 0, 2, 8, 10, 16, 18 and the values of $$k_{ref}^{RE}$$

for parameter p 1002 and 1003 can be any value from 1, 3, 9, 11, 17, 19. The values of $$k_{ref}^{RE}$$

for parameter p 1008 and 1009 can be any value from 4, 6, 12, 14, 20, 22 and the values of $$k_{ref}^{RE}$$

for parameter p 1010 and 1011 can be any value from 5, 7, 13, 15, 21, 23. For a same resourceElementOffset, the values of $$k_{ref}^{RE}$$

corresponding to different parameters p shall be different.

TABLE 4

| The parameter $k_{ref}^{RE}$ of DMRS type 1 | | | | |
|---|---|---|---|---|
| DM-RS antenna port | $k_{ref}^{RE}$ DM-RS Configuration type 1 resourceElementOffset | | | |
| p | offset00 | offset01 | offset10 | offset11 |
| 1000 | 0 | 2 | 16 | 18 |
| 1001 | 2 | 16 | 18 | 0 |
| 1002 | 1 | 3 | 17 | 19 |
| 1003 | 3 | 17 | 19 | 1 |
| 1008 | 4 | 6 | 12 | 14 |
| 1009 | 6 | 12 | 14 | 4 |
| 1010 | 5 | 7 | 13 | 15 |
| 1011 | 7 | 13 | 15 | 5 |

Figure 10:
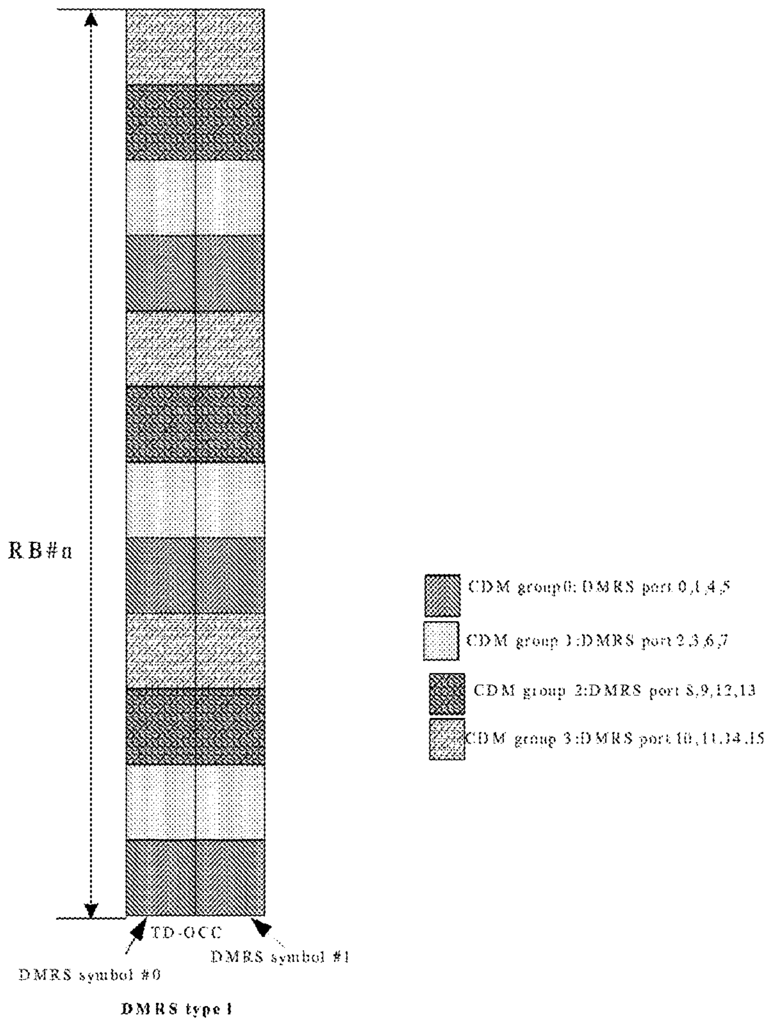
FIG. 10 is a schematic diagram illustrating an example of increasing the number of DMRS ports by comb for DMRS type 1 in accordance with some implementations of the present disclosure.

FIG. 10 is a schematic diagram illustrating an example of increasing DMRS ports by comb for DMRS type 1 in accordance with some implementations of the present disclosure.

The number of DMRS ports can be increased by changing the comb as shown in FIG. 10. Since the number of REs in an RB a DMRS port can be mapped to is three, the number of candidate subcarrier of a PTRS port is three and three resource offsets are valid as in table 5. That is, if a UE is indicated with a Release 18 DMRS port, the resourceElementOffset shall be configured as "offset00" or "offset01" or "offset11" when the number of DMRS ports is increased by comb for DMRS type 1.

In this embodiment, for DMRS type 1, the plurality of DMRS ports are grouped into 4 CDM groups and each DMRS port multiply an OCC sequence of length 3. Table 5 is an example table that includes 3 columns corresponding to a first offset value "offset00", a second offset value "offset01" and a third offset value "offset10" respectively configured by resourceElementOffset and 8 entries with each entry corresponds to each DMRS port p of the 8 DMRS ports. In table 5, for each entry of the 8 entries, a first value of subcarrier $$k_{ref}^{RE}$$

is one of the subcarrier index corresponding to the CDM group to which the DMRS port is grouped, a first value of subcarrier $$k_{ref}^{RE}$$

for the first offset value plus 4 equals a second value of subcarrier $$k_{ref}^{RE} \bmod 12$$

for the second offset value, and the second value of subcarrier $$k_{ref}^{RE}$$

for the second offset value plus 4 equals a third value of subcarrier $$k_{ref}^{RE} \bmod 12$$

for the third offset value.

TABLE 5

| The parameter $k_{ref}^{RE}$ of DMRS type 1 | | | | |
|---|---|---|---|---|
| DM-RS antenna port | $k_{ref}^{RE}$ DM-RS Configuration type 1 resourceElementOffset | | | |
| p | offset00 | offset01 | offset10 | offset11 |
| 1000 | 0 | 4 | 8 | — |
| 1001 | 4 | 8 | 0 | — |
| 1002 | 1 | 5 | 9 | — |
| 1003 | 5 | 9 | 1 | — |
| 1008 | 2 | 6 | 10 | — |
| 1009 | 6 | 10 | 2 | — |
| 1010 | 3 | 7 | 11 | — |
| 1011 | 7 | 11 | 3 | — |

Figure 11:
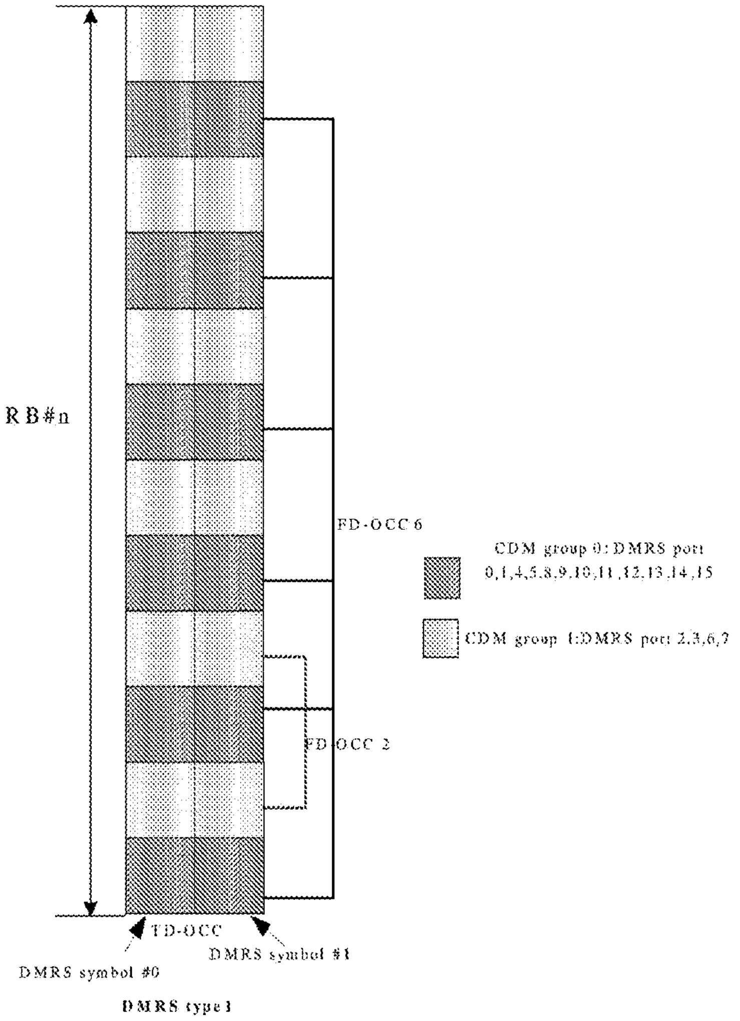
FIG. 11 is a schematic diagram illustrating an example of increasing the number of DMRS ports by FD OCC of length 6+ FD OCC of length 2 for DMRS type 1 in accordance with some implementations of the present disclosure.

FIG. 11 is a schematic diagram illustrating an example of increasing DMRS ports by FD OCC of length 6+FD OCC of length 2 for DMRS type 1 in accordance with some implementations of the present disclosure.

In this method, a DMRS port that can be mapped to 6 REs of a comb multiplies an OCC sequence of length 6, and another DMRS port that can be mapped to 6 REs of another comb multiplies an OCC sequence of length 2 as in Release 15. This method has advantage of dynamic switching between DMRS port of Release 18 and DMRS port of Release 15 and advantage of MU between a UE of Release 15 and a UE of Release 18. The subcarrier $$k_{ref}^{RE}$$

of a PTRS port is given in table 6.

In this embodiment, the plurality of DMRS ports are grouped into 2 CDM groups and each DMRS port included in one CDM group multiplies an OCC sequence of length 2 and each DMRS port included in the other CDM group multiplies an OCC sequence of length 6. Table 6 is an example table that includes 4 columns corresponding to 4 offset values respectively configured by resourceElementOffset and 8 entries with each entry corresponds to each DMRS port p of the 8 DMRS ports.

TABLE 6

| The parameter $k_{ref}^{RE}$ of DMRS type 1 | | | | |
|---|---|---|---|---|
| DM-RS antenna port | $k_{ref}^{RE}$ DM-RS Configuration type 1 resourceElementOffset | | | |
| p | offset00 | offset01 | offset10 | offset11 |
| 1000 | 0 | 2 | 6 | 8 |
| 1001 | 2 | 4 | 8 | 10 |
| 1002 | 1 | 3 | 7 | 9 |
| 1003 | 3 | 5 | 9 | 11 |
| 1008 | 4 | 6 | 10 | 0 |
| 1009 | 6 | 8 | 0 | 2 |

TABLE 6-continued

The parameter $k_{ref}^{RE}$ of DMRS type 1

| DM-RS antenna port | $k_{ref}^{RE}$ DM-RS Configuration type 1 resourceElementOffset | | | |
|---|---|---|---|---|
| p | offset00 | offset01 | offset10 | offset11 |
| 1010 | 8 | 10 | 2 | 4 |
| 1011 | 10 | 0 | 4 | 6 |

Figure 12:
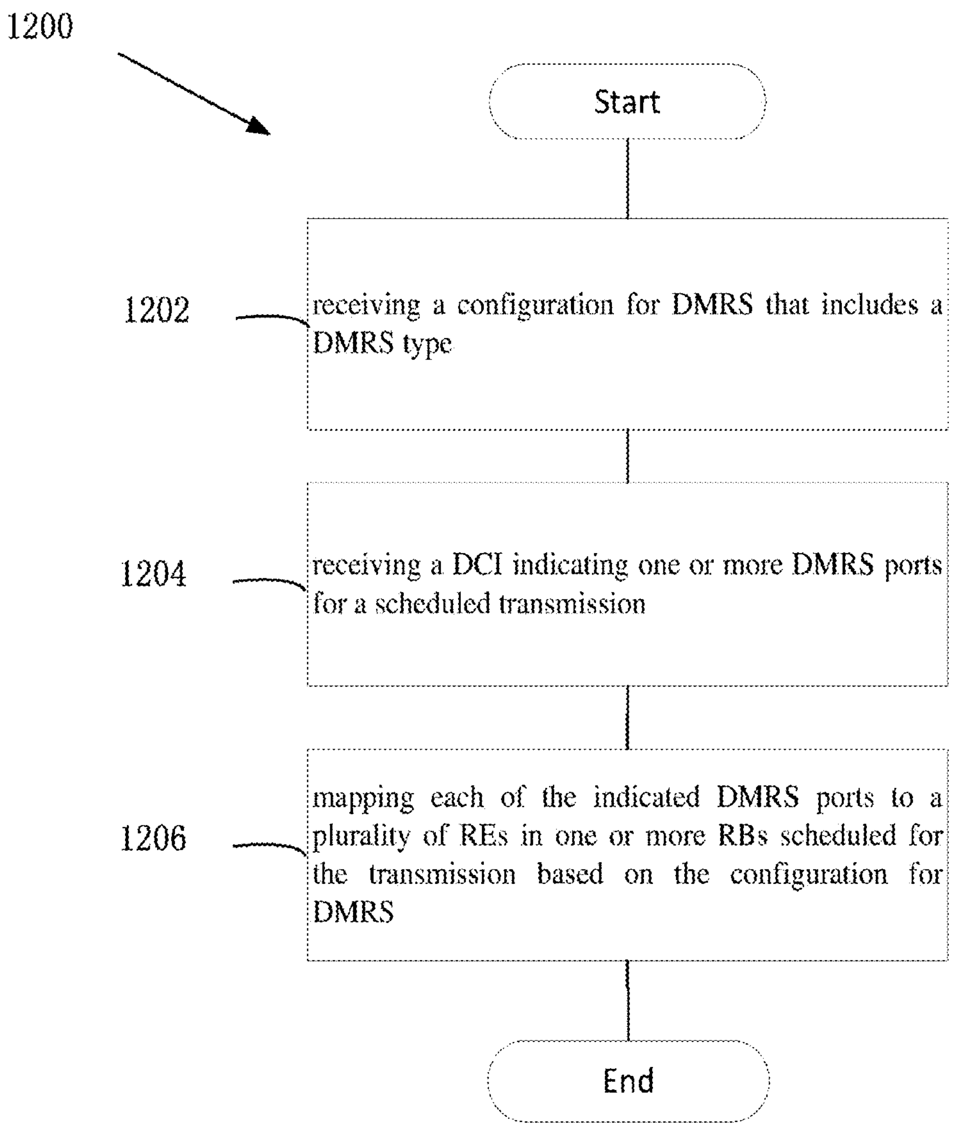
FIG. 12 is a schematic flow chart diagram illustrating steps of mapping DMRS ports in accordance with some implementations of the present disclosure.

FIG. 12 is a schematic flow chart diagram 1200 illustrating steps of mapping DMRS ports in accordance with some implementations of the present disclosure.

At step 1202, a UE receives a configuration for Demodulation Reference Signal (DMRS) that includes a DMRS type. The maximum number of DMRS ports supported by DMRS type 1 is 8 for single-symbol DMRS and 16 for double-symbol DMRS. The maximum number of DMRS ports supported by DMRS type 2 is 12 for single-symbol DMRS and 24 for double-symbol DMRS.

At step 1204, a UE receives a Downlink Control Information (DCI) indicating one or more DMRS ports for a scheduled transmission. The scheduled transmission can be a Physical Uplink Shared Channel (PUSCH) transmission or a Physical Downlink Shared Channel (PDSCH) transmission.

At step 1206, a UE maps each of the indicated DMRS ports to a plurality of Resource Elements (REs) in one or more Resource Blocks (RBs) scheduled for the transmission based on the configuration for DMRS.

Figure 13:
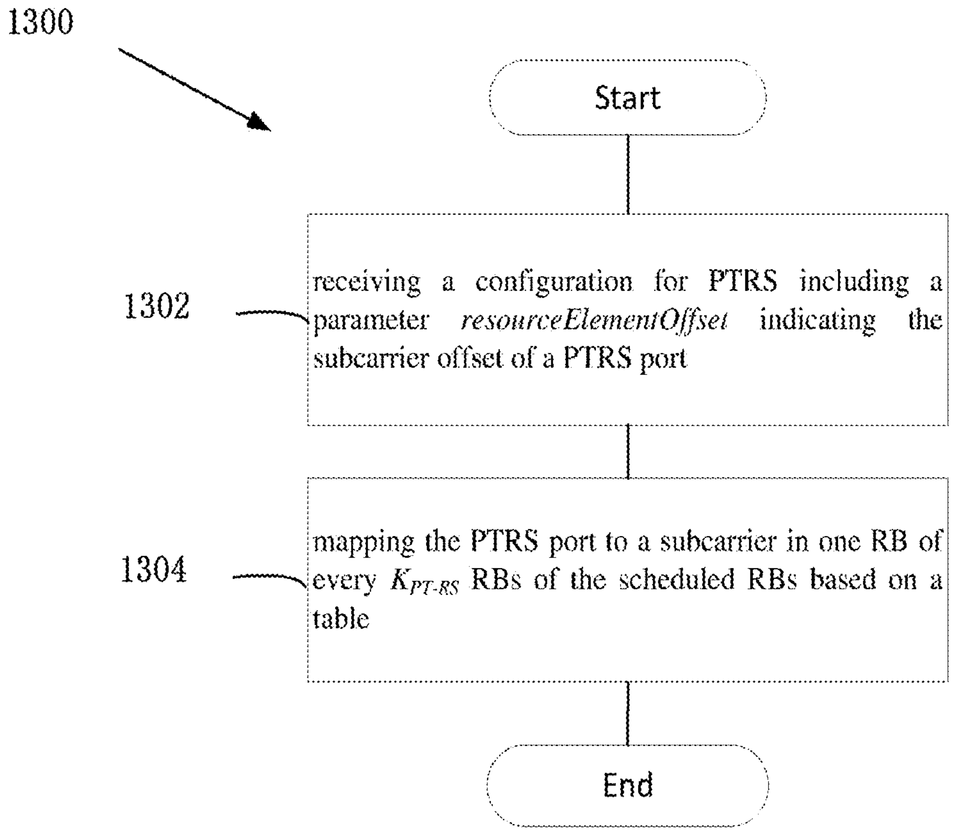
FIG. 13 is a schematic block diagram illustrating steps of mapping PTRS ports in accordance with some implementations of the present disclosure.

FIG. 13 is a schematic block diagram 1300 illustrating steps of mapping PTRS ports in accordance with some implementations of the present disclosure.

At step 1302, a UE receives a configuration for Phase Tracking Reference Signal (PTRS) including a parameter resourceElementOffset indicating the subcarrier offset of a PTRS port.

At step 1304, a UE maps the PTRS port to a subcarrier in one RB of every $K_{PT\text{-}RS}$ RBs of the scheduled RBs based on a table. $K_{PT\text{-}RS}$ is the frequency density of PTRS transmission. The table can include a parameter p indicating an index of a DMRS port associated with a PTRS port, a parameter $$k_{ref}^{RE}$$

indicating subcarrier of a PTRS port within one or two RBs, and the resourceElementOffset.

Figure 14:
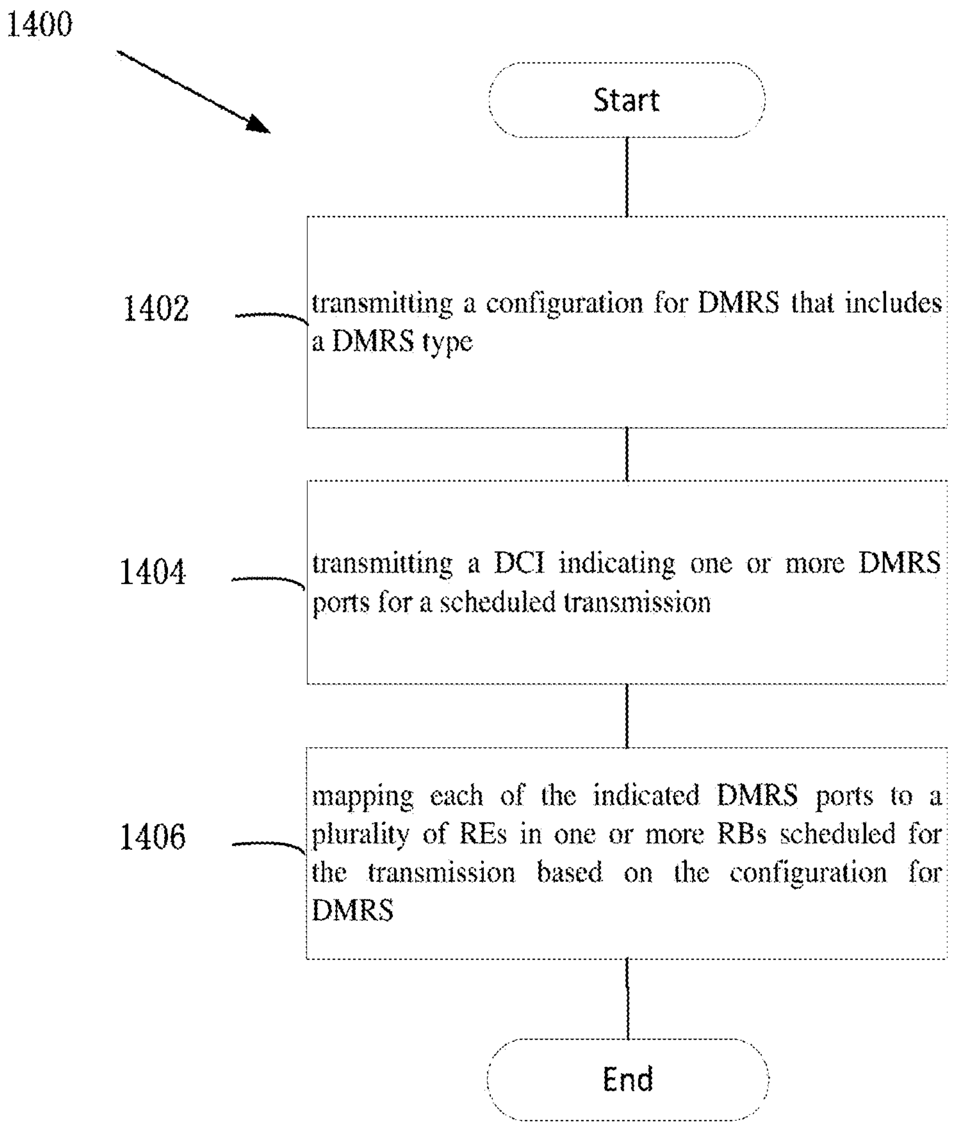
FIG. 14 is a schematic flow chart diagram illustrating steps of mapping DMRS ports in accordance with some implementations of the present disclosure.

FIG. 14 is a schematic flow chart diagram illustrating steps of mapping DMRS ports in accordance with some implementations of the present disclosure.

At step 1402, a gNB transmits a configuration for Demodulation Reference Signal (DMRS) that includes a DMRS type. The maximum number of DMRS ports supported by DMRS type 1 is 8 for single-symbol DMRS and 16 for double-symbol DMRS. The maximum number of DMRS ports supported by DMRS type 2 is 12 for single-symbol DMRS and 24 for double-symbol DMRS.

At step 1404, a gNB transmits a Downlink Control Information (DCI) indicating one or more DMRS ports for a scheduled transmission. The scheduled transmission can be a Physical Uplink Shared Channel (PUSCH) transmission or a Physical Downlink Shared Channel (PDSCH) transmission.

At step 1406, a gNB maps each of the indicated DMRS ports to a plurality of Resource Elements (REs) in one or more Resource Blocks (RBs) scheduled for the transmission based on the configuration for DMRS.

In one aspect, some items as examples of the disclosure concerning UE for mapping DMRS ports may be summarized as follows:

1. An apparatus, comprising:
   - a transceiver; and
   - a processor coupled to the transceiver, wherein the processor is configured to perform the operations comprising:
   - receiving a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 2 is 12 for single-symbol DMRS and 24 for double-symbol DMRS;
   - receiving a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and
   - mapping each of the indicated DMRS ports to a plurality of Resource Elements (REs) in one or more Resource Blocks (RBs) scheduled for the transmission based on the configuration for DMRS.
2. The apparatus of item 1, wherein an odd number of RBs are scheduled for the transmission to a TRP and the scheduled RBs comprise an orphan RB which is not paired with another RB of the scheduled RBs, wherein the type of DMRS is DMRS type 1 and each DMRS port in a Code-Division Multiplexing (CDM) group multiplies an Orthogonal Cover Code (OCC) sequence of length 4 in frequency domain, wherein mapping each of the indicated DMRS ports to the plurality of REs in one or more RBs comprise:
   - for each RB of the scheduled RBs other than the orphan RB, mapping each of the indicated DMRS ports to REs corresponding to the CDM group to which the indicated DMRS port is grouped in the RBs.
3. The apparatus of item 2, wherein mapping each of the indicated DMRS ports to the plurality of REs in one or more RBs further comprises, for the orphan RB, only mapping each of the indicated DMRS ports to a first set of REs including a plurality of REs corresponding to a CDM group to which the DMRS port is grouped in the orphan RB and without mapping any DMRS port to a second set of REs including the remaining REs corresponding to the CDM group in the orphan RB.
4. The apparatus of item 2, wherein mapping each of the indicated DMRS ports to the plurality of REs in one or more RBs comprises only mapping each of the indicated DMRS ports to REs in RBs other than the orphan RB and without mapping any DMRS port to REs in the orphan RB.
5. The apparatus of item 2, wherein mapping each of the indicated DMRS ports to the plurality of REs in one or more RBs further comprises, for the orphan RB, mapping each of the indicated DMRS ports to all the REs corresponding to a CDM group to which the DMRS port is grouped in the orphan RB, and wherein sequences, made up by first two elements of the OCC sequences corresponding to the indicated DMRS ports, are orthogonal.

6. The apparatus of item 1, the processor is further configured to perform the operations comprising:

receiving a configuration for Phase Tracking Reference Signal (PTRS) including a parameter resourceElementOffset indicating the subcarrier offset of a PTRS port; and mapping the PTRS port to a subcarrier in one RB of every $K_{PT\text{-}RS}$ RBs of the scheduled RBs based on a table, where $K_{PT\text{-}RS}$ is the frequency density of PTRS transmission, wherein the table includes a parameter p indicating an index of a DMRS port associated with a PTRS port, a parameter $$k_{ref}^{RE}$$

indicating subcarrier of a PTRS port within one or two RBs, and the resourceElementOffset.

7. The apparatus of item 1, wherein the table includes a plurality of entries corresponding to a plurality of DMRS ports supported by single-symbol DMRS and a plurality of columns corresponding to a plurality of offset values configured by resourceElementOffset, wherein in each entry the values of subcarrier $$k_{ref}^{RE}$$

correspond to the subcarriers of the associated DMRS port, and in each column the values of subcarrier $$k_{ref}^{RE}$$

for DMRS ports are different.

8. The apparatus of item 7, wherein for DMRS type 2, the plurality of DMRS ports are grouped into 6 CDM groups, the table includes 2 columns corresponding to a first offset value and a second offset value respectively configured by and resourceElementOffset 12 entries with each entry corresponds to each DMRS port p of the 12 DMRS port.

9. The apparatus of item 8, wherein the values of subcarrier $$k_{ref}^{RE}$$

are {0, 1, 2, 3, 4, 5, 6, 7, 8, 9, 10, 11} for the first offset value and are {1, 0, 3, 2, 5, 4, 7, 6, 9, 8, 11, 10} for the second offset value.

10. The apparatus of item 7, wherein for DMRS type 2, the plurality of DMRS ports are grouped into 6 CDM groups, the table includes 4 columns corresponding to a first offset value, a second offset value, a second offset value and a fourth offset value respectively configured by resourceElementOffset and 6 entries corresponding to 6 values of p which are {1000, 1001, 1002, 1003, 1004, 1005}, the values of subcarrier $$k_{ref}^{RE}$$

are {0, 1, 2, 3, 4, 5} for the first offset value, are {1, 6, 3, 8, 5, 10} for the second offset value, are {6, 7, 8, 9, 10, 11} for the third offset value, and are {7, 0, 9, 2, 11, 4} for the fourth offset value, wherein mapping the PTRS port to a subcarrier in one RB further comprises determining the subcarrier $$k_{ref}^{RE'}$$

of the PTRS port in the RB based on:

$$k_{ref}^{RE'} = 6 \cdot \left\lfloor \frac{(p-1000)}{12} \right\rfloor + k_{ref}^{RE} \bmod 6$$

wherein $$k_{ref}^{RE'}$$

is an updated parameter indicating subcarrier of the PTRS port in the RB.

11. The apparatus of item 7, wherein for DMRS type 1, the plurality of DMRS ports are grouped into 4 CDM groups and each DMRS port multiplies an OCC sequence of length 2, the table includes 2 columns corresponding to 2 offset values configured by resourceElementOffset and 8 entries with each entry corresponds to each DMRS port p of the 8 DMRS ports, wherein $$k_{ref}^{RE}$$

is defined within one RB, and the values of subcarrier $$k_{ref}^{RE}$$

are based on $$\mathrm{mod}\ (k_{ref}^{RB}, 2),$$

wherein $$k_{ref}^{RB}$$

is an RB offset for mapping the PTRS port.

12. The apparatus of item 7, wherein for DMRS type 1, the plurality of DMRS ports are grouped into 4 CDM groups and each DMRS port multiplies an OCC sequence of length 2, the table includes 4 columns corresponding to 4 offset values configured by resourceElementOffset and 8 entries with each entry corresponds to each DMRS port p of the 8 DMRS ports, wherein $$k_{ref}^{RE}$$

is defined within two adjacent RBs, and wherein mapping the PTRS port to a subcarrier in one RB further comprises mapping the PTRS port to the subcarrier k based on:

$$k = k_{ref}^{RE} + \left(iK_{PT-RS} + 2 * k_{ref}^{2RB}\right) N_{SC}^{RB}$$

where $$N_{SC}^{RB}$$

is the number of subcarriers in an RB and i=0, 1, 2, . . .

where $$k_{ref}^{2RB}$$

is calculated by:

$$k_{ref}^{2RB} = \begin{cases} n_{RNTI} \bmod \left(K_{PT-RS}/2\right) & \text{if } N_{RB} \bmod \left(K_{PT-RS}/2\right) = 0 \\ n_{RNTI} \bmod \left(N_{RB} \bmod \left(K_{PT-RS}/2\right)\right) & \text{otherwise} \end{cases}$$

where $n_{RNTI}$ is the RNTI associated with the DCI scheduling the transmission and $N_{RB}$ is the number of scheduled RBs.

13. The apparatus of item 7, wherein for DMRS type 1, the plurality of DMRS ports are grouped into 4 CDM groups and each DMRS port multiplies an OCC sequence of length 3, wherein the table includes 3 columns corresponding to a first offset value, a second offset value and a third offset value respectively configured by resourceElementOffset and 8 entries with each entry corresponds to each DMRS port p of the 8 DMRS ports, wherein for each entry of the 8 entries, a first value of subcarrier $$k_{ref}^{RE}$$

for the first offset value plus 4 equals a second value of subcarrier $$k_{ref}^{RE} \bmod 12$$

for the second offset value, and the second value of subcarrier $$k_{ref}^{RE}$$

for the second offset value plus 4 equals a third value of subcarrier $$k_{ref}^{RE} \bmod 12$$

for the third offset value.

14. The apparatus of item 7, wherein for DMRS type 1, the plurality of DMRS ports are grouped into 2 CDM groups, and each DMRS port included in one CDM group multiplies an OCC sequence of length 2 and each DMRS port included in the other CDM group multiplies an OCC sequence of length 6.

15. The apparatus of item 14, the table includes 4 columns corresponding to 4 offset values respectively configured by resourceElementOffset and 8 entries with each entry corresponds to each DMRS port p of the 8 DMRS ports.

In another aspect, some items as examples of the disclosure concerning gNB for mapping DMRS ports may be summarized as follows:

16. An apparatus, comprising:
  - a transceiver; and
  - a processor coupled to the transceiver, wherein the processor is configured to perform the operations comprising:
  - transmitting a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 2 is 12 for single-symbol DMRS and 24 for double-symbol DMRS;
  - transmitting a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and
  - mapping each of the indicated DMRS ports to a plurality of Resource Elements (REs) in one or more Resource Blocks (RBs) scheduled for the transmission based on the configuration for DMRS.

In a further aspect, some items as examples of the disclosure concerning a method of mapping DMRS ports by UE may be summarized as follows:

17. A method, comprising:
  - receiving a configuration for Demodulation Reference Signal (DMRS) that includes a DMRS type, wherein, the maximum number of DMRS ports supported by DMRS type 1 is 8 for single-symbol DMRS and 16 for double-symbol DMRS, and the maximum number of DMRS ports supported by DMRS type 1 is 12 for single-symbol DMRS and 24 for double-symbol DMRS;
  - receiving a Downlink Control Information (DCI) indicating one or more DMRS ports for a scheduled transmission, wherein the scheduled transmission is a Physical Uplink Shared Channel (PUSCH) transmission or a Physical Downlink Shared Channel (PDSCH) transmission; and mapping each of the indicated DMRS ports to a plurality of Resource Elements (REs) in one or more Resource Blocks (RBs) scheduled for the transmission based on the configuration for DMRS.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE) for wireless communication, comprising:

at least one memory; and at least one processor coupled with the at least one memory and configured to cause the UE to:

receive a configuration for a demodulation reference signal (DMRS) that includes a DMRS type, wherein a maximum number of DMRS ports supported by DMRS type 1 is eight for single-symbol DMRS and sixteen for double-symbol DMRS, and the maximum number of DMRS ports supported by DMRS type 2 is twelve for single-symbol DMRS and twenty-four for double-symbol DMRS; and receive a downlink control information (DCI) indicating one or more DMRS ports for a physical downlink shared channel (PDSCH) transmission with a frequency division multiplexing (FDM) scheme, wherein a scheduled number of physical resource blocks (PRBs) is a multiple of four and scheduled resource blocks (RBs) of the PDSCH transmission is according to an even number of different transmission configuration indication (TCI) states.

2. The UE of claim 1, wherein an odd number of RBs are scheduled for the transmission to a transmission and reception point (TRP) and the scheduled RBs comprise an orphan RB which is not paired with another RB of the scheduled RBs, wherein the type of DMRS is DMRS type 1 and each DMRS port in a code-division multiplexing (CDM) group multiplies an orthogonal cover code (OCC) sequence of length 4 in frequency domain; and the at least one processor is configured to cause the UE to map each of the indicated DMRS ports to a plurality of resource elements (REs) in one or more RBs comprising for each RB of the scheduled RBs other than the orphan RB, mapping each of the indicated DMRS ports to REs corresponding to the CDM group to which the indicated DMRS port is grouped in the RBs.

3. The UE of claim 2, wherein the at least one processor is configured to cause the UE to map each of the indicated DMRS ports to the plurality of REs in the one or more RBs comprising, for the orphan RB, only mapping each of the indicated DMRS ports to a first set of REs including a plurality of REs corresponding to a CDM group to which the DMRS port is grouped in the orphan RB and without mapping any DMRS port to a second set of REs including the remaining REs corresponding to the CDM group in the orphan RB.

4. The UE of claim 2, wherein the at least one processor is configured to cause the UE to map each of the indicated DMRS ports to the plurality of REs in the one or more RBs comprising, for the orphan RB, mapping each of the indicated DMRS ports to all the REs corresponding to a CDM group to which the DMRS port is grouped in the orphan RB, and wherein sequences, made up by first two elements of the OCC sequences corresponding to the indicated DMRS ports, are orthogonal.

5. The UE of claim 1, wherein the at least one processor is configured to cause the UE to:

receive a configuration for a phase tracking reference signal (PTRS) including a parameter resourceElementOffset indicating a subcarrier offset of a PTRS port; and map the PTRS port to a subcarrier in one RB of every $K_{PT\text{-}RS}$ RBs of the scheduled RBs based on a table, where $K_{PT\text{-}RS}$ is a frequency density of PTRS transmission, wherein the table includes a parameter p indicating an index of a DMRS port associated with the PTRS port, a parameter $$k_{ref}^{RE}$$

indicating subcarrier of the PTRS port within one or two RBs, and the resourceElementOffset.

6. The UE of claim 5, wherein the table includes a plurality of entries corresponding to a plurality of DMRS ports supported by single-symbol DMRS and a plurality of columns corresponding to a plurality of offset values configured by resourceElementOffset, wherein in each entry the values of subcarrier $$k_{ref}^{RE}$$

correspond to the subcarriers of the associated DMRS port, and in each column the values of subcarrier $$k_{ref}^{RE}$$

for DMRS ports are different.

7. The UE of claim 6, wherein for DMRS type 2, the plurality of DMRS ports are grouped into 6 CDM groups, the table includes two columns corresponding to a first offset value and a second offset value respectively configured by resourceElementOffset and twelve entries with each entry corresponds to each DMRS port of the twelve DMRS port, wherein the values of subcarrier $$k_{ref}^{RE}$$

are {0,1,4,3,4,5,0,1,0,9,10,11} for the first offset value and are {1,0,3,2,5,4,7,6,9,8,11,10} for the second offset value.

8. The UE of claim 6, wherein for DMRS type 2, the plurality of DMRS ports are grouped into six CDM groups, the table includes four columns corresponding to a first offset value, a second offset value, a third offset value and a fourth offset value respectively configured by resourceElementOffset and six entries corresponding to six values of p which are {1000,1001, 1002, 1003, 1004, 1005}, the values of subcarrier $$k_{ref}^{RE}$$

are {0,1,2,3,4,5} for the first offset value, are {1,6,3,8,5, 10} for the second offset value, are {6,7,8,9,10,11} for the third offset value, and are {7,0,9,2,11,4} for the fourth offset value; and the at least one processor is configured to cause the UE to map the PTRS port of the PTRS to a subcarrier in one RB comprising determining the subcarrier $$k_{ref}^{RE'}$$

of the PTRS port in the RB based on:

$$k_{ref}^{RE'} = 6 \cdot \left\lfloor \frac{(p-1000)}{12} \right\rfloor + k_{ref}^{RE} \bmod 6$$

wherein $$k_{ref}^{RE\prime}$$

is an updated parameter indicating subcarrier of the PTRS port in the RB.

9. The UE of claim 6, wherein for DMRS type 1, the plurality of DMRS ports are grouped into four CDM groups and each DMRS port multiplies an OCC sequence of length 2, the table includes two columns corresponding to two offset values configured by resourceElementOffset and eight entries with each entry corresponds to each DMRS port of the eight DMRS ports, wherein $$k_{ref}^{RE}$$

is defined within one RB, and the values of subcarrier $$k_{ref}^{RE}$$

are based on mod $$(k_{ref}^{RB}, 2),$$

wherein $$k_{ref}^{RE}$$

is an RB onset for mapping the PTRS port.

10. The UE of claim 6, wherein for DMRS type 1, the plurality of DMRS ports are grouped into four CDM groups and each DMRS port multiplies an OCC sequence of length 2, the table includes four columns corresponding to four offset values configured by resourceElementOffset and eight entries with each entry corresponds to each DMRS port of the eight DMRS ports, wherein $$k_{ref}^{RE}$$

is defined within two adjacent RBs, and wherein the at least one processor is configured to cause the UE to map the PTRS port to a subcarrier in one RB, comprising mapping the PTRS port to the subcarrier k based on:

$$k = k_{ref}^{RE} + \left(iK_{PT-RS} + 2 * k_{ref}^{2RB}\right)N_{SC}^{RB}$$

where $$N_{SC}^{RB}$$

is a number of subcarriers in an RB and i=0, 1, 2, . . . where the $$k_{ref}^{2RB}$$

is calculated by:

$$k_{ref}^{2RB} = \begin{cases} n_{RNTI} \bmod \left(K_{PT-RS}/2\right) & \text{if } N_{RB} \bmod \left(K_{PT-RS}/2\right) = 0 \\ n_{RNTI} \bmod \left(N_{RB} \bmod \left(K_{PT-RS}/2\right)\right) & \text{otherwise} \end{cases};$$

where $n_{RNTI}$ is a radio network temporary identifier (RNTI) associated with the DCI scheduling the transmission and $N_{RB}$ is the number of scheduled RBs.

11. The UE of claim 6, wherein for DMRS type 1, the plurality of DMRS ports are grouped into four CDM groups and each DMRS port multiplies an OCC sequence of length three, wherein the table includes three columns corresponding to a first offset value, a second offset value and a third offset value respectively configured by resourceElementOffset and eight entries with each entry corresponds to each DMRS port of the eight DMRS ports, wherein for each entry of the eight entries, a first value of subcarrier $$k_{ref}^{RE}$$

for the first offset value plus four equals a second value of subcarrier $$k_{ref}^{RE}$$

mod 12 for the second offset value, and the second value of subcarrier $$k_{ref}^{RE}$$

for the second offset value plus four equals a third value of subcarrier $$k_{ref}^{RE}$$

mod 12 for the third offset value.

12. The UE of claim 6, wherein for DMRS type 1, the plurality of DMRS ports are grouped into two CDM groups, and each DMRS port included in one CDM group multiplies an OCC sequence of length 2 and each DMRS port included in the other CDM group multiplies an OCC sequence of length 6.

13. The UE of claim 12, the table includes four columns corresponding to four offset values respectively configured by resourceElementOffset and eight entries with each entry corresponds to each DMRS port of the eight DMRS ports.

14. A base station (BS) for wireless communication, comprising:

at least one memory; and at least one processor coupled with the at least one memory and configured to cause the BS to:

transmit a configuration for a demodulation reference signal (DMRS) that includes a DMRS type, wherein a maximum number of DMRS ports supported by DMRS type 1 is eight for single-symbol DMRS and sixteen for double-symbol DMRS, and the maximum number of DMRS ports supported by DMRS type 2 is twelve for single-symbol DMRS and twenty-four for double-symbol DMRS; and transmit a downlink control information (DCI) indicating one or more DMRS ports for a physical downlink shared channel (PDSCH) transmission with a frequency division multiplexing (FDM) scheme, wherein a scheduled number of physical resource blocks (PRBs) is a multiple of four and scheduled resource blocks (RBs) of the PDSCH transmission is according to an even number of different transmission configuration indication (TCI) states.

15. A method performed by a user equipment (UE), the method comprising:

receiving a configuration for a demodulation reference signal (DMRS) that includes a DMRS type, wherein a maximum number of DMRS ports supported by DMRS type 1 is eight for single-symbol DMRS and sixteen for double-symbol DMRS, and the maximum number of DMRS ports supported by DMRS type 2 is twelve for single-symbol DMRS and twenty-four for double-symbol DMRS; and receiving a downlink control information (DCI) indicating one or more DMRS ports for a physical downlink shared channel (PDSCH) transmission with a frequency division multiplexing (FDM) scheme, wherein a scheduled number of physical resource blocks (PRBs) is a multiple of four and scheduled resource blocks (RBs) of the PDSCH transmission is according to an even number of different transmission configuration indication (TCI) states.

16. The method of claim 15, wherein an odd number of RBs are scheduled for the transmission to a transmission and reception point (TRP) and the scheduled RBs comprise an orphan RB which is not paired with another RB of the scheduled RBs, wherein the type of DMRS is DMRS type 1 and each DMRS port in a code-division multiplexing (CDM) group multiplies an orthogonal cover code (OCC) sequence of length 4 in frequency domain; and the method further comprises: mapping each of the indicated DMRS ports to a plurality of resource elements (REs) in one or more RBs comprising for each RB of the scheduled RBs other than the orphan RB, mapping each of the indicated DMRS ports to REs corresponding to the CDM group to which the indicated DMRS port is grouped in the RBs.

17. The method of claim 16, further comprising: mapping each of the indicated DMRS ports to the plurality of REs in the one or more RBs comprising, for the orphan RB, only mapping each of the indicated DMRS ports to a first set of REs including a plurality of REs corresponding to a CDM group to which the DMRS port is grouped in the orphan RB and without mapping any DMRS port to a second set of REs including the remaining REs corresponding to the CDM group in the orphan RB.

18. The method of claim 16, further comprising: mapping each of the indicated DMRS ports to the plurality of REs in the one or more RBs comprising, for the orphan RB, mapping each of the indicated DMRS ports to all the REs corresponding to a CDM group to which the DMRS port is grouped in the orphan RB, and wherein sequences, made up by first two elements of the OCC sequences corresponding to the indicated DMRS ports, are orthogonal.

19. The method of claim 15, further comprising:

receiving a configuration for a phase tracking reference signal (PTRS) including a parameter resourceElementOffset indicating a subcarrier offset of a PTRS port; and mapping the PTRS port to a subcarrier in one RB of every $K_{PT-RS}$ RBs of the scheduled RBs based on a table, where $K_{PT-RS}$ is a frequency density of PTRS transmission, wherein the table includes a parameter p indicating an index of a DMRS port associated with the PTRS port, a parameter $$k_{ref}^{RE}$$

indicating subcarrier of the PTRS port within one or two RBs, and the resourceElementOffset.

20. A method performed by a base station (BS), the method comprising:

transmitting a configuration for a demodulation reference signal (DMRS) that includes a DMRS type, wherein a maximum number of DMRS ports supported by DMRS type 1 is eight for single-symbol DMRS and sixteen for double-symbol DMRS, and the maximum number of DMRS ports supported by DMRS type 2 is twelve for single-symbol DMRS and twenty-four for double-symbol DMRS; and transmitting a downlink control information (DCI) indicating one or more DMRS ports for a physical downlink shared channel (PDSCH) transmission with a frequency division multiplexing (FDM) scheme, wherein a scheduled number of physical resource blocks (PRBs) is a multiple of four and scheduled resource blocks (RBs) of the PDSCH transmission is according to an even number of different transmission configuration indication (TCI) states.

* * * * *